(12) United States Patent
Chang et al.

(10) Patent No.: US 10,070,009 B2
(45) Date of Patent: Sep. 4, 2018

(54) SELECTION OF HALFTONING TECHNIQUE BASED ON MICROSTRUCTURE DETECTION

(71) Applicant: KYOCERA Document Solutions Inc., Osaka (JP)

(72) Inventors: Michael M. Chang, El Segundo, CA (US); Dongpei Su, El Segundo, CA (US); Kenneth A. Schmidt, El Segundo, CA (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 15/359,957

(22) Filed: Nov. 23, 2016

(65) Prior Publication Data

US 2018/0084149 A1    Mar. 22, 2018

Related U.S. Application Data

(60) Provisional application No. 62/397,977, filed on Sep. 22, 2016.

(51) Int. Cl.
*H04N 1/405* (2006.01)
*G06K 15/00* (2006.01)

(52) U.S. Cl.
CPC ... *H04N 1/4055* (2013.01); *H04N 2201/0094* (2013.01)

(58) Field of Classification Search
CPC .............. H04N 1/4055; H04N 2201/0094
See application file for complete search history.

(56) References Cited

U.S. PATENT DOCUMENTS

| 2009/0027704 A1* | 1/2009 | Kobayashi ......... H04N 1/00864 358/1.9 |
| 2009/0067006 A1* | 3/2009 | Kobayashi ......... H04N 1/00864 358/3.06 |
| 2013/0148168 A1* | 6/2013 | Bernal ................. G06T 1/0028 358/3.06 |

* cited by examiner

*Primary Examiner* — Quang N Vo
(74) *Attorney, Agent, or Firm* — McDonnell Boehnen Hulbert & Berghoff LLP

(57) ABSTRACT

An example embodiment may involve obtaining a digital image containing a pixel block. An AM halftone may be configured to be applied to the digital image by default. The example embodiment may also involve deriving, from the pixel block, a bitmap defining foreground and non-foreground pixels of the pixel block. The example embodiment may also involve sequentially scanning horizontal lines of the bitmap to identify clusters of foreground pixels. Each pixel in a particular cluster of the clusters of foreground pixels may be either (i) the only pixel in the particular cluster, or (ii) vertically or horizontally adjacent to another pixel in the particular cluster. The example embodiment may also involve, possibly based on the clusters of foreground pixels identified in the bitmap, applying an FM halftone to the digital image, and causing the digital image to be printed with the applied FM halftone.

20 Claims, 27 Drawing Sheets

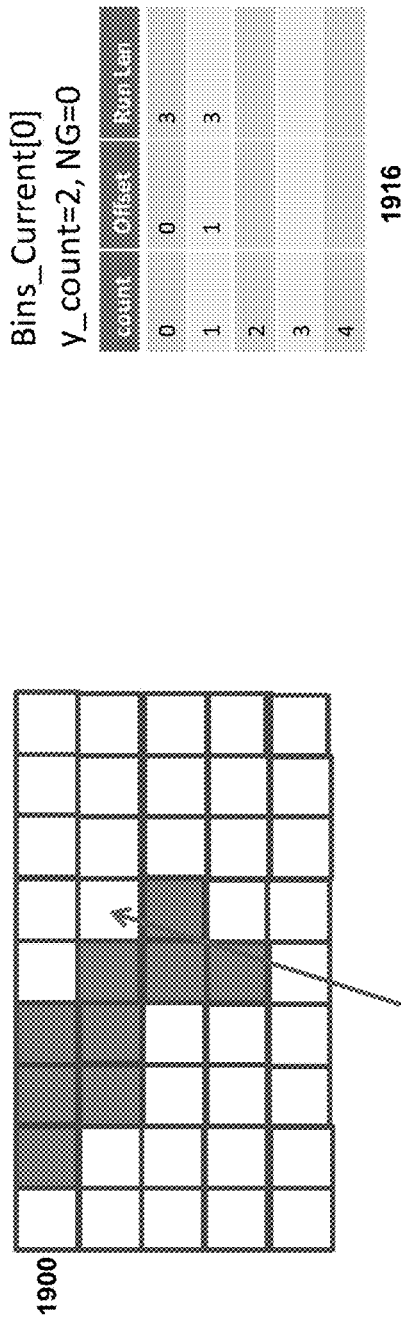

Bins_Current[0]
y_count=2, NG=0

1916

Overlap_Info
start = 0 *(previous_line started a run)*
start_count = 1 *(run of 1 before Overlap occurred)*
end = 0 *(previous_line ended the Overlap)*
end_count = 1 *(current_line ran for 1 more after Overlap ended)*
Overlap_count = 2

1910

1914

S3, update Overlap_Info, copy Bins_Prev[0] to Bins_Current[0], then append to bin by entering proper Offset and Run Length info, which is derived from Overlap_Info.

Bins_Prev[0]
y_count=2, NG=0

| count | start | end ix |
|---|---|---|
| 0 | 0 | |
| 1 | 1 | 3 |
| 2 | | |
| 3 | | 3 |
| 4 | | |

1920

Overlap_Info
start = 0 *(previous_line started a run)*
start_count = 2 *(run of 2 before Overlap occurred)*
end = NA
end_count = NA
Overlap_count = NA

1910

1918

S22, update Overlap_Info. The counters:
FG_run_current = 1
FG_run_prev = 3

SELECTION OF HALFTONING TECHNIQUE BASED ON MICROSTRUCTURE DETECTION

CROSS-REFERENCE TO RELATED APPLICATION

This application claims priority to U.S. provisional patent application No. 62/397,977, filed Sep. 22, 2016, which is hereby incorporated by reference in its entirety.

BACKGROUND

In recent years, various types of printing devices have become popular for both business and consumer use. In addition to traditional black and white printers, color printers, scanners, copiers, fax machines, and other components are now common. Multi-function peripherals (MFPs) that support two or more of these operations are also widely available. As these devices have grown more prevalent, they are being used for processing of more sophisticated and complicated documents that may include text and graphics.

Some of these documents contain microstructures—patterns of pixels that repeat in various locations throughout one or more pages of the document. When such a document is printed using certain types of halftoning, the microstructures may disappear completely or create patterns of interference that distort the document's contents. Thus, without addressing this problem, the printed versions of the document might not contain the same information as their digital representations.

SUMMARY

A first example embodiment may involve obtaining, from a memory, a digital image containing a pixel block. An AM halftone may be configured to be applied to the digital image by default. The first example embodiment may also involve deriving, from the pixel block, a bitmap defining foreground and non-foreground pixels of the pixel block. The first example embodiment may also involve sequentially scanning horizontal lines of the bitmap to identify clusters of foreground pixels. Each pixel in a particular cluster of the clusters of foreground pixels may be either (i) the only pixel in the particular cluster, or (ii) vertically or horizontally adjacent to another pixel in the particular cluster. The first example embodiment may also involve, possibly based on the clusters of foreground pixels identified in the bitmap, applying an FM halftone to the digital image, and causing the digital image to be printed with the applied FM halftone.

A second example embodiment may include a non-transitory, computer-readable storage medium, having stored thereon program instructions that, upon execution by a computing device, cause the computing device to perform operations in accordance with the first example embodiment.

A third example embodiment may include a computing device containing a processor and data storage. The data storage may include program instructions that, when executed by the processor, cause the computing device to perform operations in accordance with the first example embodiment.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIGS. 19A, 19B, 19C, 19D, 19E, 19F, and 19G depict processing of a cluster of foreground pixels, according to example embodiments.

DETAILED DESCRIPTION OF THE DRAWINGS

Example methods and systems are described herein. Other example embodiments or features may further be utilized, and other changes may be made, without departing from the scope of the subject matter presented herein. In the following detailed description, reference is made to the accompanying figures, which form a part thereof.

The example embodiments described herein are not meant to be limiting. Thus, aspects of the present disclosure, as generally described herein and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

1. Introduction

Printing technology has evolved over the last 30-plus years from simple dot-matrix-based output devices producing only black and white printouts to today's advanced laser-based printing devices that can produce high-resolution color printouts. Additionally, modern printing devices may also function as copiers, scanners, and fax machines. To do so, they may be able to store numerous electronic documents that are queued for printing or faxing, or that have been scanned. Thus, many printing devices are specialized forms of computing devices that may include, for example, one or more processors, data storage, and input/output interfaces.

Regardless of the type of printing device, it is generally expected that printouts that issue therefrom accurately represent the source document, whether that source document is digital or analog. However, the use of halftoning—a technique that allows a printing device to simulate a continuous tone on a printout—with certain types of image microstructures can result in the printout losing or distorting the information represented in the source document.

Herein, embodiments address this situation by detecting potentially problematic microstructures in a source document, and then choosing a halftoning technique for printing that is likely to represent the source document in a more visually appealing fashion. The resulting printouts may exhibit less information loss and/or distortion.

2. Example Printing Device

Figure 1:
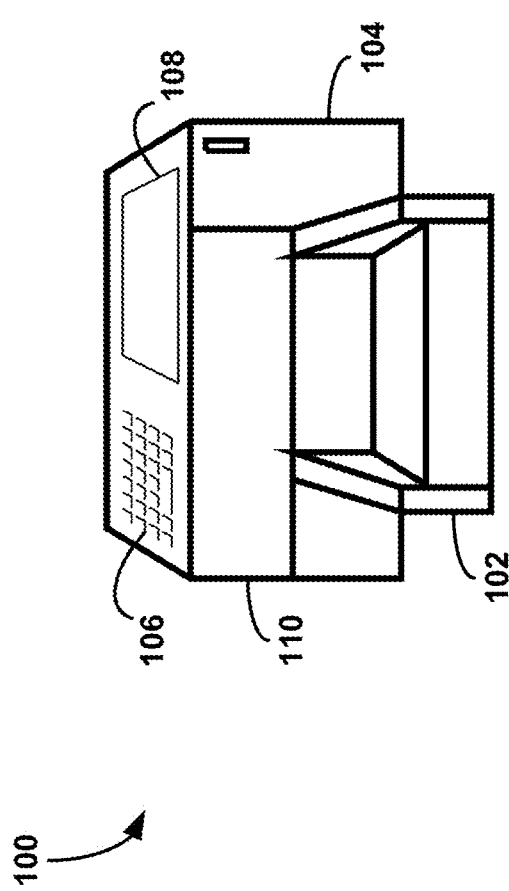
FIG. 1 depicts a printing device, according to example embodiments.

FIG. 1 depicts an example printing device 100. Printing device 100 may be configured to print partially-stored and/or fully-stored electronic documents on various types of physical output media. These output media include, but are not limited to, various sizes and types of paper, overhead transparencies, and so on. Printing device 100 may be interchangeably referred to as a "printer."

Printing device 100 may serve as local peripheral to a computing device, such as a personal computer, a server device, a print server, etc. In these cases, printing device 100 may be attached to the computing device by cable, such as a serial port cable, parallel port cable, Universal Serial Bus (USB) cable, Firewire (IEEE 1394) cable, or High-Definition Multimedia Interface (HDMI) cable. Thus, the computing device may serve as a source of electronic documents for printing device 100.

On the other hand, printing device 100 may include a wireline or wireless network interface, such as an Ethernet or 802.11 (Wife) interface. So arranged, printing device 100 may serve as a printing device for any number of computing devices that can communicate with printing device 100 over a network. In some embodiments, printing device 100 may serve as both a local peripheral and a networked printer at the same time.

In order to use printing device 100, computing devices may install one or more printer drivers. These printer drivers may include software components that convert the electronic documents to be printed from various local representations stored on the computing devices to one or more representations supported by printing device 100.

Regardless, printing device 100 may be considered to be a non-generic type of computing device, and may carry out both printing-related and non-printing related tasks. For instance, printing device 100 may also include copier, fax, and scanner functions. In some embodiments, printing device 100 may use a scanning unit to facilitate copier and/or fax functions. For instance, printing device 100 may scan a physical document into an electronic format, and then print the resulting electronic document to provide a copy, and/or transmit the resulting electronic document via a telephone interface to provide a fax operation. Additionally, printing device 100 may be able to receive a faxed electronic document via a telephone interface, store a representation of this electronic document, and print it out.

In order to support its various capabilities, printing device 100 may include a document feeder/output tray 102, paper storage 104, user interface 106, scanning element 108, and chassis 110. But, printing devices may take on a wide variety of forms. Therefore printing device 100 may include more or fewer components than depicted in FIG. 1, and/or components arranged in a different fashion than depicted in FIG. 1.

Document feeder/output tray 102 may hold physical documents (e.g., a stack of one or more sheets of paper) that are to be scanned, copied or faxed. Advantageously, document feeder/output tray 102 may allow printing device 100 to automatically feed multiple physical documents for processing by printing device 100 without requiring manual intervention. Document feeder/output tray 102 may also include one or more separate output trays for holding physical documents that have been processed by printing device 100. These may include physical documents that have been scanned, copied or faxed by printing device 100, as well as printouts that have been produced by, e.g., the printer, fax, and/or copying functions of printing device 100.

Paper storage 104 may include trays and/or feeding elements for various types of physical media. For instance, paper storage 104 may include separate trays for 8.5×11 inch paper, A4 paper, letterhead paper, envelopes, and so on. For any operation of printing device 100 that involves outputting physical media (e.g., printing, copying, and/or receiving a fax), paper storage 104 may supply the physical media.

User interface 106 may facilitate the interaction of printing device 100 with a human or non-human user, such as to receive input from a user and to provide output to the user. Thus, user interface 106 may include input components such as a keypad, keyboard, touch-sensitive or presence-sensitive panel, joystick, microphone, still camera and/or video camera. User interface 106 may also include one or more output components such as a display screen (which, for example, may be combined with a presence-sensitive panel), a cathode ray tube (CRT), a liquid crystal display (LCD), a light emitting diode (LED) based display, a display using digital light processing (DLP®) technology, a light bulb, and/or one or more other similar devices, now known or later developed. User interface 106 may also be configured to be able to generate audible output(s), via a speaker, speaker jack, audio output port, audio output device, earphones, and/or other similar devices, now known or later developed in the future.

Scanning element 108 may be a glass panel below which a movable light source operates to scan physical media placed on top of the glass panel. Alternatively, a digital camera below the glass panel may "scan" the physical media placed on top of the glass panel by taking a picture of the physical media. Images of scanned physical media may be stored as documents in data storage associated with printing device 100. In some embodiments, the glass panel may be replaced with any type of transparent panel.

Chassis 110 may include a physical housing that contains and/or interconnects various components of printing device 100, such as document feeder/output tray 102, paper storage 104, user interface 106, and scanning element 108. Additionally, chassis 110 may house other components not shown in FIG. 1. For example, chassis 110 may contain one or more toner cartridges, liquid ink jets, belts, rollers, and/or power supplies. Further, chassis 110 may include communication interfaces, such as a wireline and/or wireless network interfaces, a telephony interface (e.g., a RJ45 jack), a USB interface, a BLUETOOTH® interface, a card reader port, etc.

Figure 2:
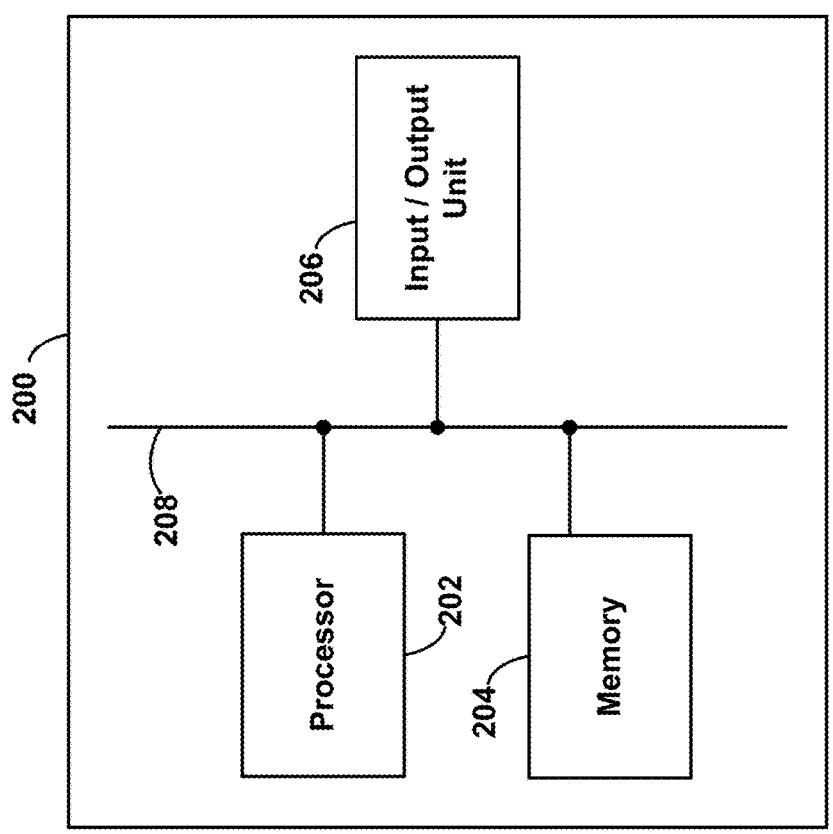
FIG. 2 is a block diagram illustrating computing components of a printing device, according to example embodiments.

Moreover, as printing device 100 may be based on general-purpose and/or specially-designed computing device components, chassis 110 may also house some or all of these components. To that point, FIG. 2 depicts an example embodiment 200 of computing device components (e.g., elements of a computing device) that may be included in printing device 100.

Computing device components 200 may include a processor 202, memory 204, and input/output unit 206, all of which may be coupled by a system bus 208 or a similar mechanism. Processor 202 may include one or more central processing units (CPUs), such as one or more general purpose processors and/or one or more dedicated processors (e.g., application specific integrated circuits (ASICs) or digital signal processors (DSPs), etc.).

Memory 204, in turn, may comprise volatile and/or non-volatile data storage and can be integrated in whole or in part with processor 202. Memory 204 may store program instructions, executable by processor 202, and data that are manipulated by these instructions to carry out the various methods, processes, or operations described herein. Alternatively, these methods, processes, or operations can be defined by hardware, firmware, and/or any combination of hardware, firmware and software. Therefore, memory 204 may include a tangible, non-transitory computer-readable medium, having stored thereon program instructions that, upon execution by one or more processors, cause printing device 100 to carry out any of the methods, processes, or operations disclosed in this specification or the accompanying drawings.

Memory 204 may also be configured to store compressed and non-compressed electronic documents that may later be processed (e.g., printed). Thus, memory 204 may serve as an output medium for these electronic documents.

Input/output unit 206 may include any of the operations and/or elements described in reference to user interface 106. Thus, input/output unit 206 may serve to configure and/or control the operation of processor 202. Input/output unit 206 may also provide output based on the operations performed by processor 202.

These examples of a printing device are provided for illustrative purposes. In addition to and/or alternatively to the examples above, other combinations and/or sub-combinations of printer and computer technologies may also exist, amongst other possibilities, without departing from the scope of the embodiments herein.

Figure 3:
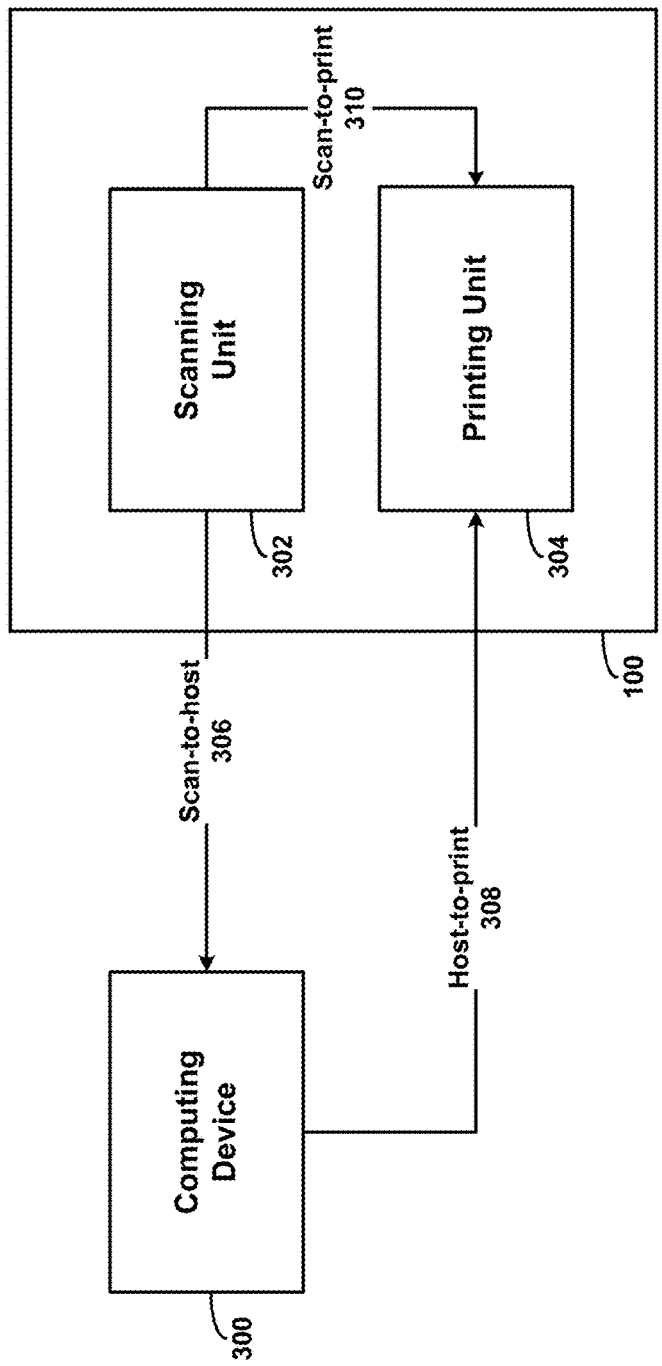
FIG. 3 is a block diagram illustrating various data paths involving a printing device, according to example embodiments.

FIG. 3 depicts some of the possible data paths through which a representation of an electronic document processed by printing device 100 may pass. In FIG. 3 it is assumed that printing device 100 may include a scanning unit 302 and a printing unit 304. Control of each of these units may be implemented in hardware, firmware, software, or any combination of hardware, firmware and/or software. Additionally, each of scanning unit 302 and printing unit 304 may communicate with computing device 300, and possibly with other computing devices as well. In some situations, the data paths supported by printing device 100 may be referred to a "pipelines."

A scan-to-print data path 310 may be supported by scanning unit 302 and printing unit 304. Scan-to-print data path 310 may be used, e.g., when a user instructs printing device 100 to copy a physical document. In response to this instruction, scanning unit 302 may scan the physical document into an electronic document, and transmit the electronic document via scan-to-print data path 310 to printing unit 304. Use of scan-to-print data path 310 may involve at least temporarily storing some or all of the electronic document (possibly in a compressed format) in the data storage of printing device 100. Then, printing unit 304 may print the electronic document to physical media (e.g., one or more sheets of paper).

A scan-to-host data path 306 may also be supported by scanning unit 302 and computing device 300. Scan-to-host data path 306 may be used, e.g., when a user instructs printing device 100 to scan a physical document. The user may also instruct printing device 100 to transmit a representation of the resulting electronic document to computing device 300, or printing device 100 may be pre-configured to automatically transmit the electronic document to computing device 300. Thus, in response to this instruction, scanning unit 302 may scan the physical document into an electronic document, and transmit the resulting electronic document via scan-to-host data path 306 to computing device 300. Use of scan-to-print data path 310 may involve at least temporarily storing (possibly in a compressed format) some or all of the electronic document in the data storage of printing device 100, and transmitting a representation of the resulting electronic document to computing device 300.

A host-to-print data path 308 may be supported by computing device 300 and printing unit 304. Host-to-print data path 308 may be used, e.g., when a user instructs computing device 300 to print an electronic document on printing device 100. In response to this instruction, computing device 300 may transmit a representation of the electronic document to printing unit 304. Printing device 100, via printing unit 304, may print the electronic document to physical media. Some, or all, of the electronic document may be stored (possibly in a compressed format) in the data storage of printing device 100 before and/or during the printing of the electronic document.

3. Example Image Color Models

Electronic documents can be represented using a number of color models. In each of these color models, colors may be logically divided into a number of channels (sometimes equivalently referred to as color channels). The combination of two or more of such channels may allow a printing device to provide printouts containing a wide variety of colors and shadings.

For example, the red-green-blue (RGB) color model may be used for display of images on electronic output devices, such as televisions, monitors, and computer screens. RGB is an additive color model in which red, green, and blue light are added together in various ways to produce a spectrum of colors. For instance, cyan may be formed by combining green and blue, yellow may be formed by combining red and green, magenta may be formed by combining red and blue, and white may be formed by combining red, green, and blue.

A particular pixel of an RGB image may be expressed as a three-channel tuple (R,G,B), each channel of which can vary from zero to a pre-defined maximum value (e.g., 255). If all of the channels are 0, the result may be black. If all of the channels are at the maximum value, the result may be the brightest representable white.

RGB output is typically device-dependent, in that different output devices may display the same RGB image in a different fashion. Thus, in some cases, these differences may be perceivable by humans. In some embodiments, physical documents scanned into printing device 100 using scan-to-host data path 306 may be encoded using an RGB color model.

The cyan-magenta-yellow (CMY) color model may be used for the printing of color images by printing devices. CMY is a subtractive color model in which cyan, yellow, and magenta are applied to a white surface in various ways to reproduce a spectrum of colors. For instance, red can be formed by combining magenta and yellow, blue can be formed by combining cyan and magenta, and green can be formed by combining cyan and yellow. Thus, the CMY color model might be considered a complement of the RGB color model.

A particular pixel of a CMY image may be expressed as a three-channel tuple (C,M,Y), each channel of which can vary from 0 to a pre-defined maximum value. If all of the channels are at 0, the result may be white. If all of the channels are at the maximum value, the result may be black.

Like, RGB output, CMY output is typically device-dependent, in that the printed output of the same CMY image on different printing devices may appear to be different. In some cases, these differences may be perceivable by humans. In some embodiments, electronic documents printed by printing device 100 using host-to-print data path 308 and/or scan-to-print data path 310 may be encoded using a CMY color model.

In some embodiments, a four-channel CMYK color model can also be used. This four-channel model of CMYK may be similar to or the same as the CMY color model, with the exception that a key (black) channel is also used. In addition to possibly combining cyan, magenta, and yellow to form black, the separate key (black) ink source may be used to form black. Thus, a particular pixel of a CMYK image may be expressed as a four-channel tuple (C,M,Y,K), each channel of which can vary from zero to a pre-defined maximum value.

Using the CMYK color model, the same colors as the CMY model can be supported, but less ink is typically used because the K colorant can replace mixtures of the C, M, and Y colorants. However, the CMYK color model might not always be able to be conveniently converted to and from other color models, because the addition of the K colorant adds redundancy, e.g., the same color can be a result of mixing different C, M, Y, and K combinations. In some embodiments, one or more color tables may be used to convert pixels from the CMY model to the CMYK model, and/or between other pairs of color models.

An additional color model is gray, also referred to as grayscale, which may be used for the representation of black and white images. Unlike the RGB and CMY/CMYK color models, each pixel of the gray color model is expressed using a single channel (K) that encodes the pixel's intensity. The values used by the gray channel can vary from zero for black, to a pre-defined maximum value for white (e.g., 255). In some embodiments, one or more of the data paths supported by printing device 100 may be able to encode images using the gray color model.

Another color model is YCbCr. In some implementations, this color model may be used as an alternative representation of an image. Particularly, the Y channel may represent the brightness of a pixel, and the Cb and Cr channels may represent the blue-yellow chrominance and red-green chrominance, respectively. The YCbCr color model has a well-defined relationship with the RGB and CMY color models and can be converted to and from either of these color models with relative ease.

4. Example Halftoning

Many digital images contain continuous tones, in which a color or grayscale section of the image smoothly transitions from a lighter tone to a darker tone, or vice versa. However, some printing devices do not support continuous tones. Instead, a printing device may support a discrete number of tones from the lightest tone and darkest tone. For instance, a simple black and white printing device may support only outputting either black or white for any given pixel of the image.

Halftoning includes the process of breaking down a continuous tone image into patterns of pixel shading to create the illusion of smoothly transitioning grays or colors. It should be noted that herein the term "image" may refer to a full electronic document or part of an electronic document, such as a pixel block. In some of the examples below, for sake of simplicity, operations may be illustrated on pixel blocks (e.g., m×n arrangements of pixels) rather than full documents. Further, such images may include text and/or graphics, or be representations of text and/or graphics documents.

Figure 4:
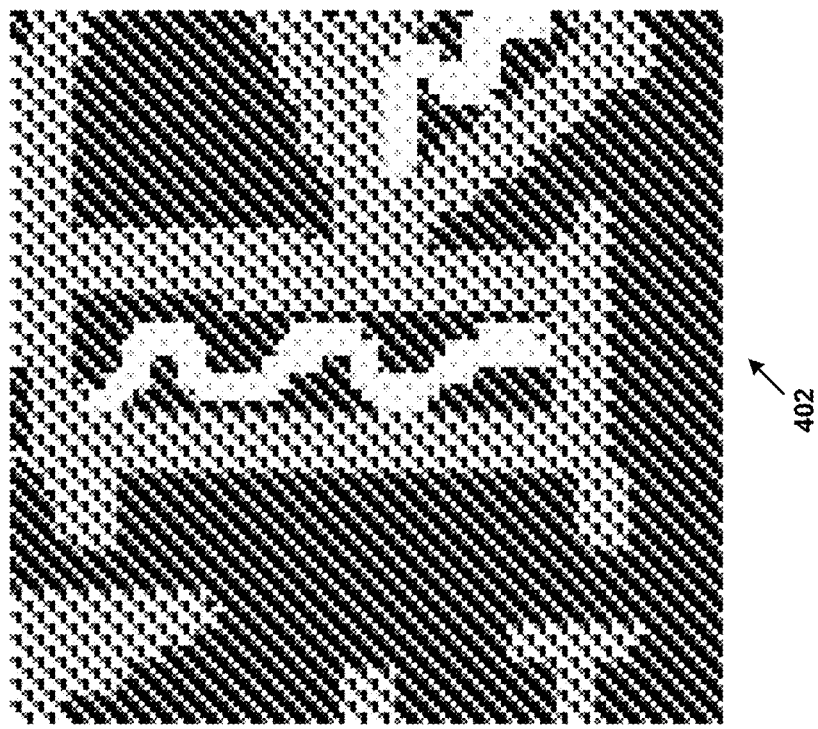
FIG. 4 depicts application of a halftone matrix to pixels of an image, according to example embodiments.
Figure 4:
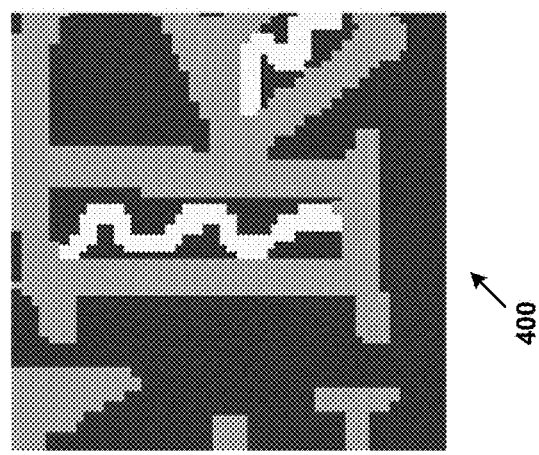

FIG. 4 depicts an example pixel block 400. For purposes of simplicity and illustration, pixel block 400 includes a single color channel with three distinct shades of gray. As an example, it may be assumed that pixel block 400 is 128×128 pixels in size.

Halftoning involves overlaying a halftone matrix on a pixel block, so that the pixel block can be printed on a printing device that supports a limited number of tones. For instance, in pixel block 400, none of the gray tones are pure black or pure white. But if pixel block 400 were to be printed on a printing device that only supports pure black and pure white tones, much of the detail in pixel block 400 may be lost.

For instance, a printing device that supports a particular resolution (e.g., 600 dots per inch) in black and white mode may either print a black dot or not print a black dot in 600 locations per linear inch of a printout. However, this high resolution allows the printing device to effectively print shades of solid gray by printing patterns of black and white dots. For example, if the printing device prints a checkerboard patterns, this pattern may appear, to the human eye, to be a solid gray with a tone roughly halfway between black and white.

Thus, applying appropriate patterns to pixel blocks results in a black and white printer being able to support multiple shades of gray. The same logic applies to generating color tones in printouts on color printers.

With respect to pixel block 400, applying halftoning thereto may result in pixel block 402. Pixel block 402 is also slightly enlarged for purposes of illustration. Notably, pixel block 402 consists only of pixels that black or white. Each tone in pixel block 400 has been filtered by a different halftoning pattern to produce the binary pixel patterns in pixel block 402.

More formally, a halftone matrix may be a p×q block of cells, each cell containing one or more threshold values. When applying the halftone matrix to an image, the halftone matrix may be tiled over the image, such that each pixel in the image is pairwise associated with a cell in one of the tiles. The halftone matrix may be defined based on the characteristics of a particular printing device, and therefore may be device specific.

Each pixel from the pixel block may be compared one or more threshold value(s) to determine a halftone value for the pixel. For instance, in a grayscale color channel, the pixels may take on a value of 0-255, indicative of the intensity or brightness of that pixel. The associated cell may contain three threshold values, 64, 128, and 240, thus defining four ranges: 0-64, 65-128, 129-240, and 241-255. The value of the pixel falls into one of these ranges, and the range that the pixel falls in may define the halftone value of the pixel. Therefore, the halftone value of the pixel may be defined with a 2-bit value. For example, 00 may indicate the range 0-64, 01 may indicate the range 65-128, 10 may indicate the range 129-240, and 11 may indicate the range 241-255.

Thus, if there are i−1 thresholds defined for each cell in the halftone matrix, then these thresholds may define i ranges, and the range in which a pixel value falls may be represented by a $\log_2(i)$-bit value. Applying the halftone matrix to each pixel in the image may result in a halftone version of the image in which each pixel is represented by the $\log_2(i)$-bit value. This halftone version may then be sent to a printing device that supports i tones. In the example of the simple binary black-or-white printing device described above, only two tones are supported.

Figure 5:
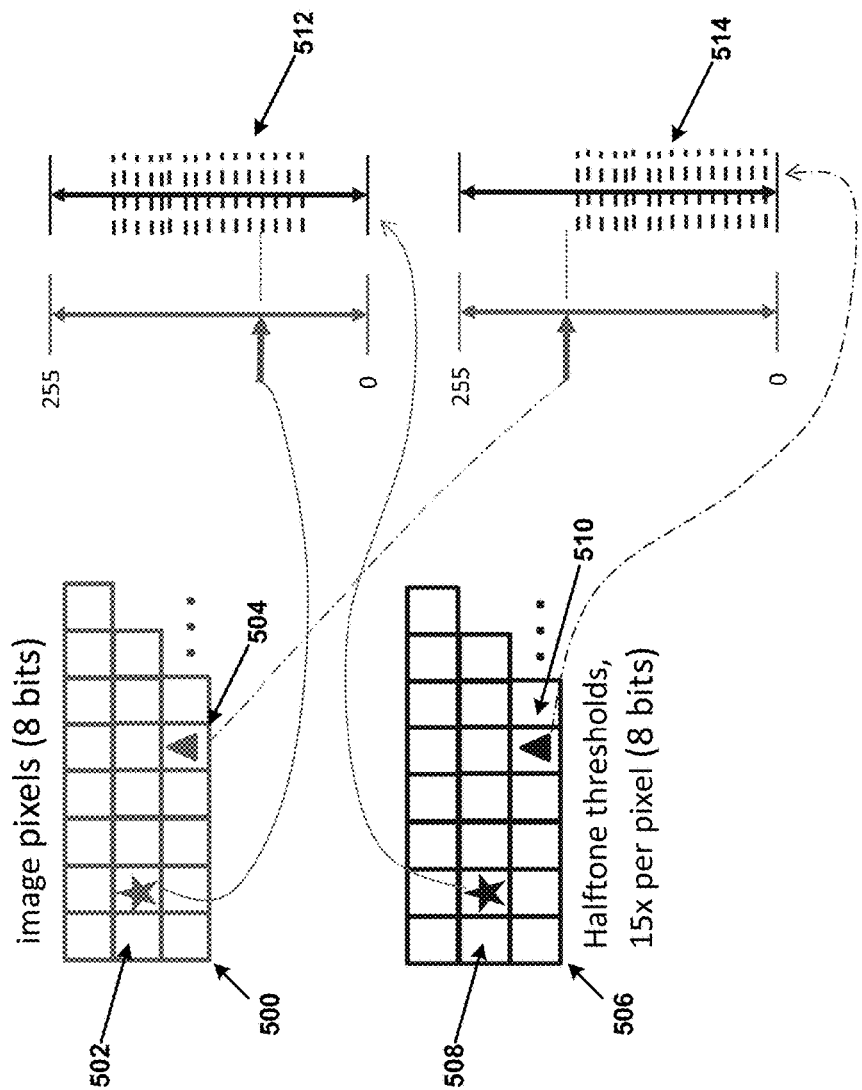
FIG. 5 depicts halftone thresholds, according to example embodiments.

Halftone thresholding is illustrated in FIG. 5. Image pixel matrix 500 contains a number of individual pixels from a pixel block, including example pixels 502 and 504, each taking on an 8-bit value (i.e., 0-255). Halftone matrix 506 contains a pattern of cells, including example cells 508 and 510, each supporting representations of 15 threshold values (i.e., indicating 16 ranges, indexed from 0 to 15, within the overall range of 0-255).

Halftone matrix 506 may be overlaid on image pixel matrix 500 such that example cell 508 is associated with example pixel 502, and example cell 510 is associated with example pixel 504. The value of example pixel 502 may be mapped to a range defined by the thresholds of example cell 508, and the value of example pixel 504 may be mapped to a range defined by the thresholds of example cell 510.

Each example cell may define different thresholds. For instance, example cell 508 may define thresholds 512, while example cell 510 may define thresholds 514. Mapping the pixels to these respective thresholds may result in determining that the value of example pixel 502 falls between the fourth and fifth threshold of thresholds 512, and the value of example pixel 504 falls above the fifteenth threshold of thresholds 514. Thus, the halftone value of example pixel 502 may be represented as 4, while the halftone value of example pixel 504 may be represented as 15.

More generally, suppose that a cell of the halftone matrix defines i−1 thresholds. If the pixel value is greater than or equal to the highest threshold, the halftone value is i−1. If the pixel value is less than the lowest threshold, the halftone value is 0. If the pixel value is greater than or equal to the cth threshold but less than the (c−1)th threshold, the halftone value is c.

By applying these halftoning techniques, printing devices can accurately represent the tones in source documents, even if the printing device supports only a limited number of tones.

Figure 6:
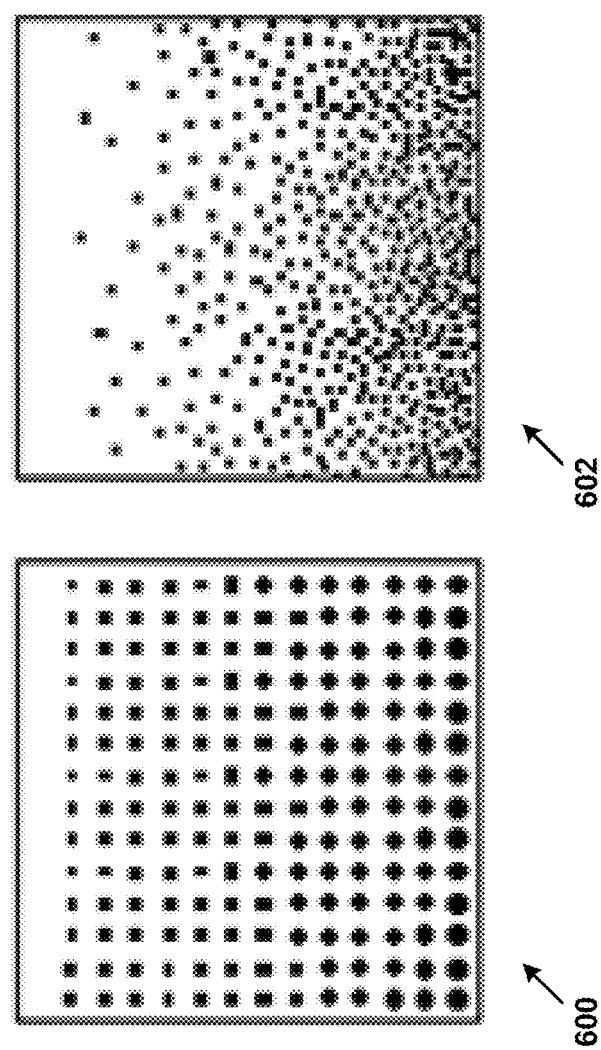
FIG. 6 depicts AM and FM halftone patterns, according to example embodiments.

There are two main types of halftoning techniques: amplitude modulation (AM) and frequency modulation (FM). AM halftoning uses patterns of different sizes, while FM halftoning stochastically simulates patterns by varying the spacing and density of halftone dots. FIG. 6 provides examples of each technique.

In FIG. 6, pattern 600 is an AM halftone, and pattern 602 is an FM halftone. While both halftoning techniques can achieve the same goals, they do so in different manners.

The AM halftone pattern includes dots that are arranged in a regular matrix formation, but vary in size. The larger dots result in darker printed tones, which the smaller dots result in lighter printed tones. When applied to a pixel block, pattern 600 may result in the printout of the pixel block having darker tones at the bottom, and progressively lighter tones as one moves from bottom to top along the printout.

The FM halftone includes same or similarly-size dots arranged irregularly. A higher density of dots in a given location of the pattern results in darker printed tones, while a lower density of dots results in lighter printed tones. Like pattern 600, when applied to a pixel block, pattern 602 may result in the printout of the pixel block having darker tones at the bottom, and progressively lighter tones as one moves from bottom to top along the printout.

Since both AM and FM halftones can produce continuous tones in printouts, one might assume that they can be used interchangeably. However, this is not always the case. In theory, AM halftones are more stable and robust for laser printers, and result in a higher visual quality. Since FM halftones are noisy by their very nature, their resulting printouts can appear grainy. Thus, AM halftones are generally preferred over FM halftones.

5. Example Microstructures and Halftone Selection Based Thereon

Modern software, such as word processing, presentation, drawing, and other types of productivity software, may support operations that allow a user to define a shape that has a particular color and/or texture. The textures may be formed by various patterns and/or dithers, and can be applied to text fonts, lines, or shapes.

Figure 7:
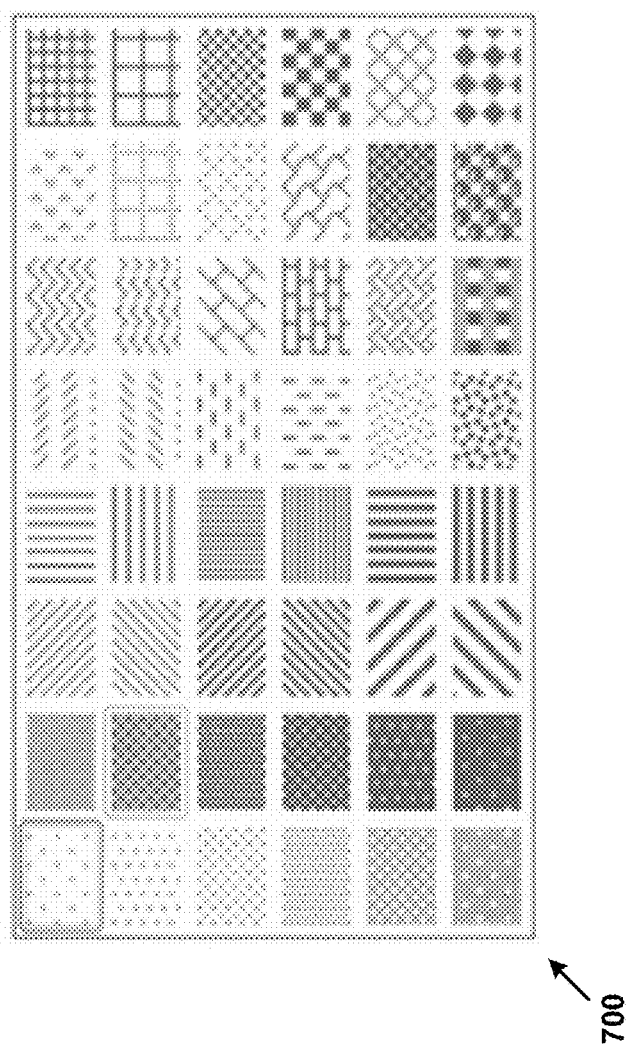
FIG. 7 depicts patterns and dithers that produce microstructures, according to example embodiments.

FIG. 7 provides an example palette 700 of patterns and dithers that may be supported by a program. Each of these patterns and dithers, when selected, provides a different characteristic or texture to an object. Such patterns and dithers may be implemented using one or more microstructures. A microstructure may be defined as an arrangement of a small number of adjacent pixels (e.g., no more than 12-20 pixels that are vertically and/or horizontally adjacent) that repeats in an image.

The presence of these microstructures can cause at least two distinct problems when combined with AM halftoning. Some microstructures partially or completely disappear after halftoning, and others interact with the halftoning pattern to create low-frequency "beats" that change the tones of pixel blocks in an unpredictable and undesirable fashion.

Figure 8:
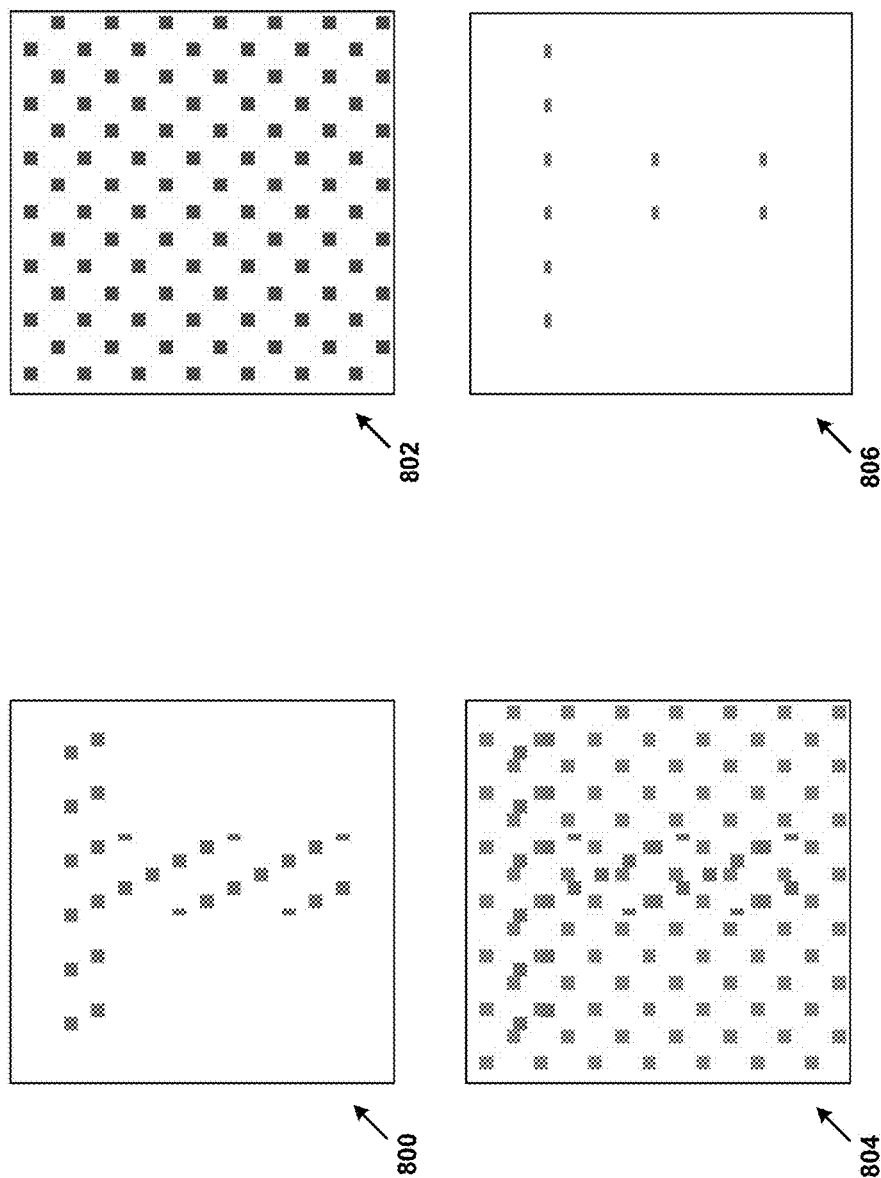
FIG. 8 depicts how an AM halftone can interact with microstructures, according to example embodiments.

FIG. 8 provides an example of how AM halftoning can cause microstructures to partially disappear. Block 800 contains a representation of the letter "T" to which a texture has been applied. Thus, the "T" consists of a number of microstructures rather than solid coloring. Block 802 contains a representation of an AM halftone pattern. Block 804 depicts the AM halftone pattern of block 802 overlaid on the microstructures of block 800. As is evident, there is little overlap between halftoning dots and the microstructures. Block 806 depicts this overlap, and thus represents how block 800 would appear if printed using the halftone pattern of block 802. Notably, in block 806, the shape of the "T" is barely recognizable.

Figure 9:
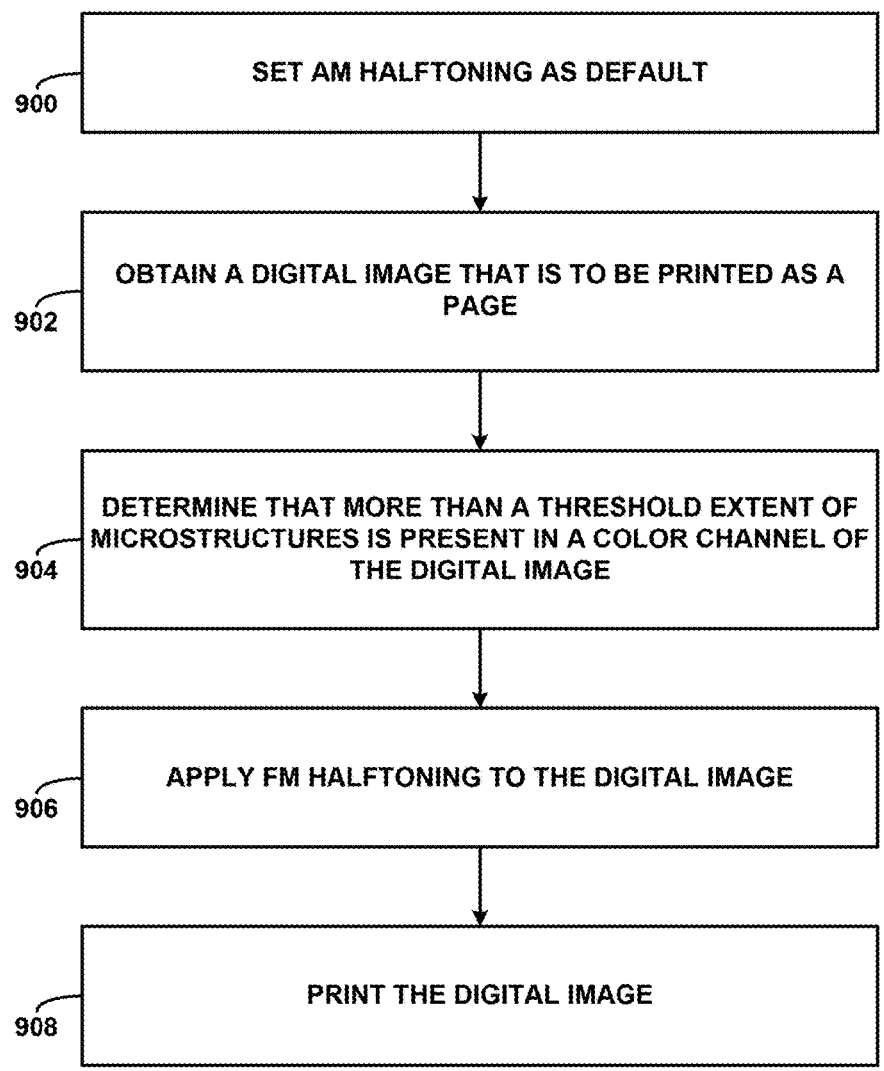
FIG. 9 is a flow chart, according to example embodiments.

In order to address the drawbacks of using AM halftoning on pixel blocks that contain microstructures, halftone selection may be made, page-by-page, based on the extent of microstructures that are in the pixel blocks that make up the page. FIG. 9 is a flow chart that provides a high-level overview of a solution in accordance with the embodiments herein.

At block 900, AM halftoning is set as the default halftoning technique. As noted above, AM halftoning general results in printouts that appear better to the human eye than FM halftoning.

At block 902, a computing device (e.g., a printing device) may obtain a digital image that is to be printed as a page. The digital image may consist of a number of pixels in a rectangular arrangement, for example.

At block 904, the computing device may determine that more than a threshold extent of microstructures is present in a color channel of the digital image. These calculations may involve a number of algorithms, and will be detailed below.

At block 906, possibly in response to the determination of block 904, the computing device may apply FM halftoning to the digital image. Conversely, if the determination of block 904 is not made, the computing device may apply AM halftoning to the digital image.

At block 908, the computing device may cause the digital image to be printed using the selected halftoning technique. In this manner, digital images with an extent of microstructures that may interact poorly with AM halftoning will be printed using FM halftoning instead.

Thus, the computing device may switch between AM and FM halftoning on a page by page basis. This may cause pages that were produced using AM halftoning to appear different from those produced using FM halftoning, because AM and FM halftoning applied to the same source tone may produce slightly different tones in a printout.

To address this discrepancy, a dedicated color conversion table may be used with FM halftoning. For example, this color conversion table may be applied to source tones in the digital image before the FM halftone is applied to such converted tones. In this manner, colors in the printout produced by FM halftoning are closer to those produced by AM halftoning.

6. Example Microstructure Detection

With respect to block 904, microstructure detection may take place in three phases. Further, the detection algorithm may operate sequentially on pixel blocks of the digital image. These pixel blocks may be, for instance, 128×128 pixels or 64×64 pixels. In general, m×n pixel blocks may be used, where m and n may have the same or different values.

First, a Boolean bitmap of the digital image may be produced. The bitmap may differentiate between foreground and non-foreground (e.g., background) pixels. Second, the horizontal lines of the bitmap are scanned from top to bottom to identify clusters of pixels that are potential microstructures. Third, the identified clusters are post-processed to determine whether they are indeed microstructures as defined herein.

This approach has a number of advantages. It only requires one pass through each pixel, and uses a small buffer to catalog clusters. It also allows for flexible definition of the sizes and shapes of microstructures. Further, the computational and memory requirements are small enough for this approach to work well as a hardware implementation.

This approach also has advantages over other techniques. For instance, while Fourier analysis can be used to detect microstructures, this would require significantly more computational power than the embodiments herein. Also, region-growing approaches via tracing arbitrary 2D paths through the bitmap could detect microstructures, but this technique uses more computational and run-time memory resources than the embodiments herein. Another approach involves separately capturing horizontal and vertical runs of foreground pixels that are coincidental and repeat frequently, but in order for this technique to be robust, significantly more run-time memory is required than the embodiments herein.

a. Foreground/Non-Foreground Bitmap Production

In order to detect microstructures, Boolean bitmaps indicating the locations of foreground and non-foreground pixels may be determined for respective pixel blocks. In some embodiments, these operations may be performed on the whole digital image rather than separately to the pixel blocks therein.

Regardless, each processed pixel is marked in the bitmap as either being foreground or non-foreground. A foreground pixel is one that contains a pixel value that has a sufficiently greater intensity than surrounding pixels. Scanning for clusters only considers foreground pixels because the impact that microstructures have on non-foreground pixels is typically small.

In some embodiments, each pixel is considered in view of its 48 closest neighbors that are no more than 3 pixels distant. In other words, each pixel is processed as the center pixel of a 7×7 window of pixels. But other window sizes may be used. If a pixel is too near the edge of the digital image, fewer than 48 neighboring pixels may be taken into account. For instance, all neighboring pixels that are no more than 3 pixels distant may be considered.

The foreground detection techniques described herein may operate either in an additive color model (where higher pixel values represent a greater amount of light, all the way toward full white), or a subtractive color model (where higher pixel values represent increasing light absorption, all the way toward darkness). For purposes of this discussion, a subtractive color model is assumed.

Initially, all values of the pixels under consideration (e.g., 49 pixels for a 7×7 window) are read in order to determine their range. This range is found by subtracting the minimum pixel value from the maximum pixel value. If the range is less than a threshold value, e.g., 16, then the pixel under review is considered non-foreground.

If this is not the case, a near-minimum subrange and a near-maximum subrange are also determined. The former is from the minimum pixel value to the minimum pixel value plus ⅛ of the range, and the latter is from the maximum pixel value minus ⅛ of the range to the maximum pixel value. For instance, if the minimum pixel value is 100 and the maximum pixel value is 228, then the range of pixel values is 128. ⅛ of this range is 16, so the near-minimum range is 100-116 and the near-maximum range is 212-228. Thresholds other than ⅛ may be used.

Thus, three subranges are defined: the near-minimum subrange, the near-maximum subrange, and a middle subrange between the near-minimum and near-maximum subranges. If any of the pixels in the window fall within the middle subrange, the pixel under review is considered to be non-foreground. Otherwise, if the pixel under review falls in the near-minimum subrange, it is considered to be non-foreground. If the pixel under review falls in the near-maximum subrange, it is considered to be foreground.

In some embodiments, the Boolean bitmaps may include three designations: foreground, non-bimodal, and background. In these cases, pixels that fall into the middle subrange are considered to be non-bimodal (e.g., neither foreground nor background) and pixels that fall into the near-minimum subrange are considered to be background. Background pixels may contain microstructures—for instance, an area that is filled with a colorant but has periodic small "holes" in it can produce printed artifacts not unlike foreground microstructures. In the features described below, any processing that is applied to foreground microstructures may be applied to background microstructures as well.

b. Bitmap Scanning for Clusters

In order to find clusters of pixels within the bitmap, such clusters should be clearly defined. For the embodiments herein, a cluster may refer to orthogonally adjacent foreground pixels. For instance, top-bottom and left-right neighboring pixels are parts of the same cluster, while diagonally neighboring pixels are not.

Figure 10:
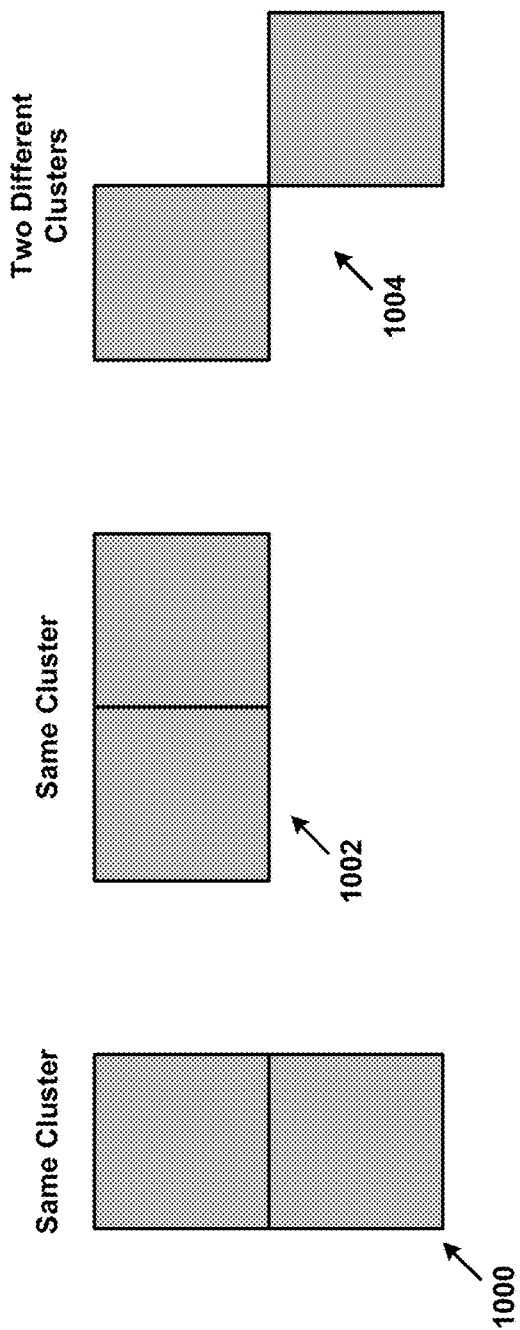
FIG. 10 depicts parts of foreground pixel clusters, according to example embodiments.

Examples are illustrated in FIG. 10. The vertically-adjacent pixels 1000 and the horizontally-adjacent pixels 1002 form respective clusters. However, the diagonally-adjacent pixels 1004 are part of two different clusters (this assumes that there are no other pixels that vertically or horizontally connect diagonally-adjacent pixels 1004).

Figure 11:
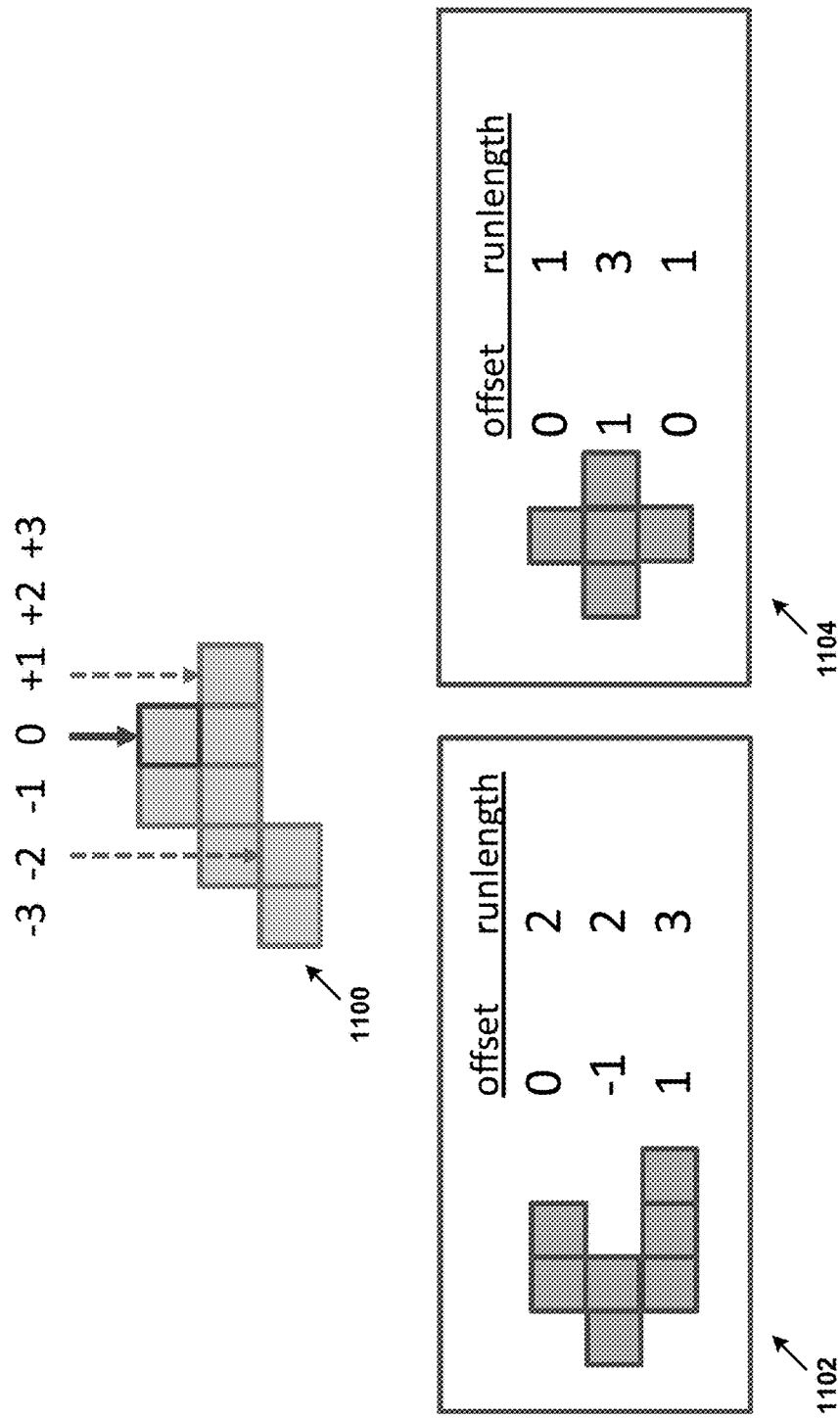
FIG. 11 depicts a representation of a foreground pixel cluster, according to example embodiments.

A cluster consisting of an arbitrary number of pixels can be compactly defined in the following manner, with reference to FIG. 11. In cluster 1100 (which only shows foreground pixels), the position of the last pixel of the topmost row of pixels is set as offset 0. Pixels to the right of offset 0 have positive offsets, while pixels to the left of offset 0 have negative offsets. Subsequent (lower) rows of the cluster are given the offset values of their rightmost pixel. For instance, in cluster 1100, the second row has an offset of 1, while the third row has an offset of −2. The combination of offset and run length defines each row.

Clusters 1102 and 1104 provide further examples. In cluster 1102, the topmost row has an offset of 0 and a run length of 2, the second row has an offset of −1 and a run length of 2, and the third row has an offset of 1 and a run length of 3. In cluster 1104, the topmost row has an offset of 0 and a run length of 1, the second row has an offset of 1 and a run length of 3, and the third row has an offset of 0 and a run length of 1.

Figure 12:
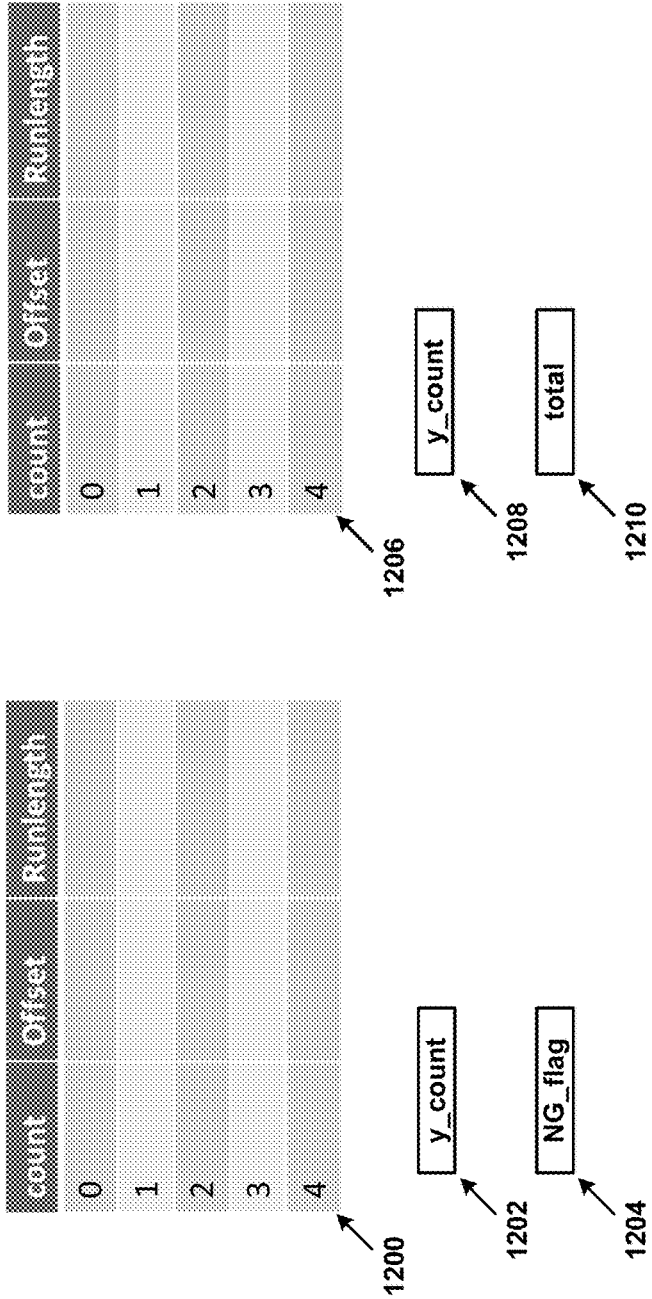
FIG. 12 depicts contents of a bin and a library entry, according to example embodiments.

Given this definition of clusters, data structures used to represent these clusters can be defined. These include bins, each of which defines a single cluster, and a library that stores N detected clusters. These data structures are depicted in FIG. 12.

A bin contains a table, 1200, y_count 1202, and NG_flag 1204. Table 1200 includes a row for each row of pixels in a particular cluster. The count column defines the row number, the offset column defines the offset for this row, and the run length column defines the run length for this row. The value of y_count 1202 is the index of next available current row. The value of NG_flag is 0 until it is determined that the cluster defined by table 1200 is not a microstructure (if such a determination happens). For instance, if the run length of any row is greater than a threshold value (e.g., 4, 5, 6, etc.), if y_count exceeds a threshold value (e.g., 4, 5, 6, etc.), or if the total number of pixels in the cluster exceeds a threshold value (e.g., 16, 25, 36, etc.) then the cluster is deemed to be too large to be a microstructure, and NG_flag is set to 1.

A library entry includes a table 1206, y_count 1208, and total 1210. Table 1206 is substantially the same as table 1200, and y_count 1208 is substantially the same as y_count 1202. The value of total 1210 represents the number of times the cluster defined by table 1206 has appeared in the current pixel block.

Any bin for which NG_flag is still 0 after the associated cluster has been processed may be added to the library. Bins for which NG_flag is 1 are not accepted in the library. When adding a bin to the library, each entry already in the library is checked to determine whether the cluster defined by the bin is already represented in the library. If this is the case, the value of total in the library entry containing the cluster is incremented. If the cluster is not already in the library, the cluster is added to the library in a new library entry.

Figure 13:
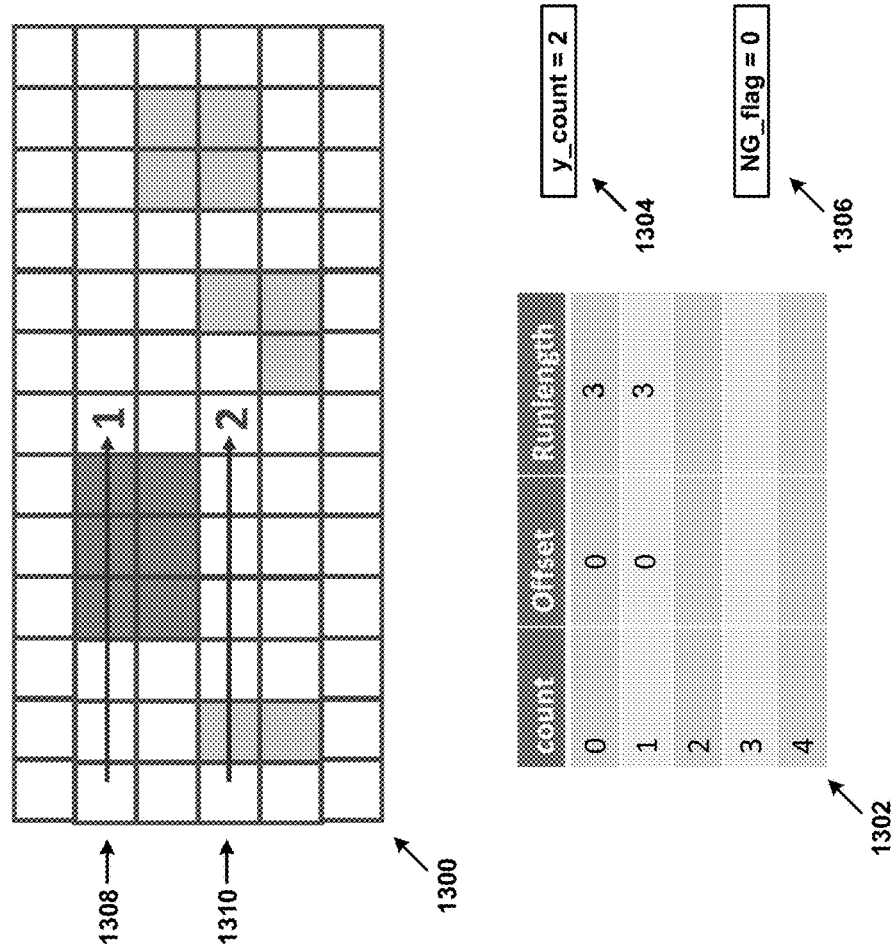
FIG. 13 depicts detection of a foreground pixel cluster, according to example embodiments.

As noted above, the foreground/non-foreground bitmap may be scanned line by line, from top to bottom, to detect clusters. An example of such detection is shown in FIG. 13. Pixel block 1300 contains four distinct clusters, but the focus of this discussion will be on the 6-pixel cluster in the upper-left quadrant. Table 1302, y_count 1304, and NG_flag 1306 represent a bin.

The top row of pixel block 1300 is scanned left-to-right, but no pixels are detected. The second row, designated as row 1308, is then scanned in the same direction. When the scanning reaches pixel 1, the first run has ended. Therefore, the first entry in table 1302 is added, and y_count is set to 1. Then the third row is scanned, the run therein is added table 1302, and y_count is incremented to 2.

When the scanning reaches pixel 2 of the fourth row (designated row 1310), it is determined that the cluster is completely defined by table 1302. Thus, y_count remains at 2. So long as the size or shape of the cluster does not trigger NG_flag to be set to 1 (and with a cluster of this size and shape that is not expected to happen), the bin is sent to the library.

In order to perform this scanning in reliable fashion for an entire pixel block, a state machine may be used. An example state machine consisting of 24 states (denoted as states S1 through state S24) is presented herein. However, more or few states may be used in some embodiments.

The state machine considers two rows of the pixel block at a time, the current row and the previous row. The previous row is the row immediately above the current row, and was scanned in the most recent previous pass. In cases where there is no previous row (i.e., when the current row is the topmost row), only the current row is considered.

A number of bins are used to temporarily store information on clusters found in the current pixel block. For a pixel block of m×n pixels, there are m pixels per row. Thus, in a worst case scenario, there will be m/2 bins needed for current row and the previous row (i.e., if the pixel block contains a checkerboard pattern in which there are m/2 foreground pixels per row). This puts an upper limit on the amount of memory needed for bins, which simplifies hardware implementation of these embodiments.

Figure 14:
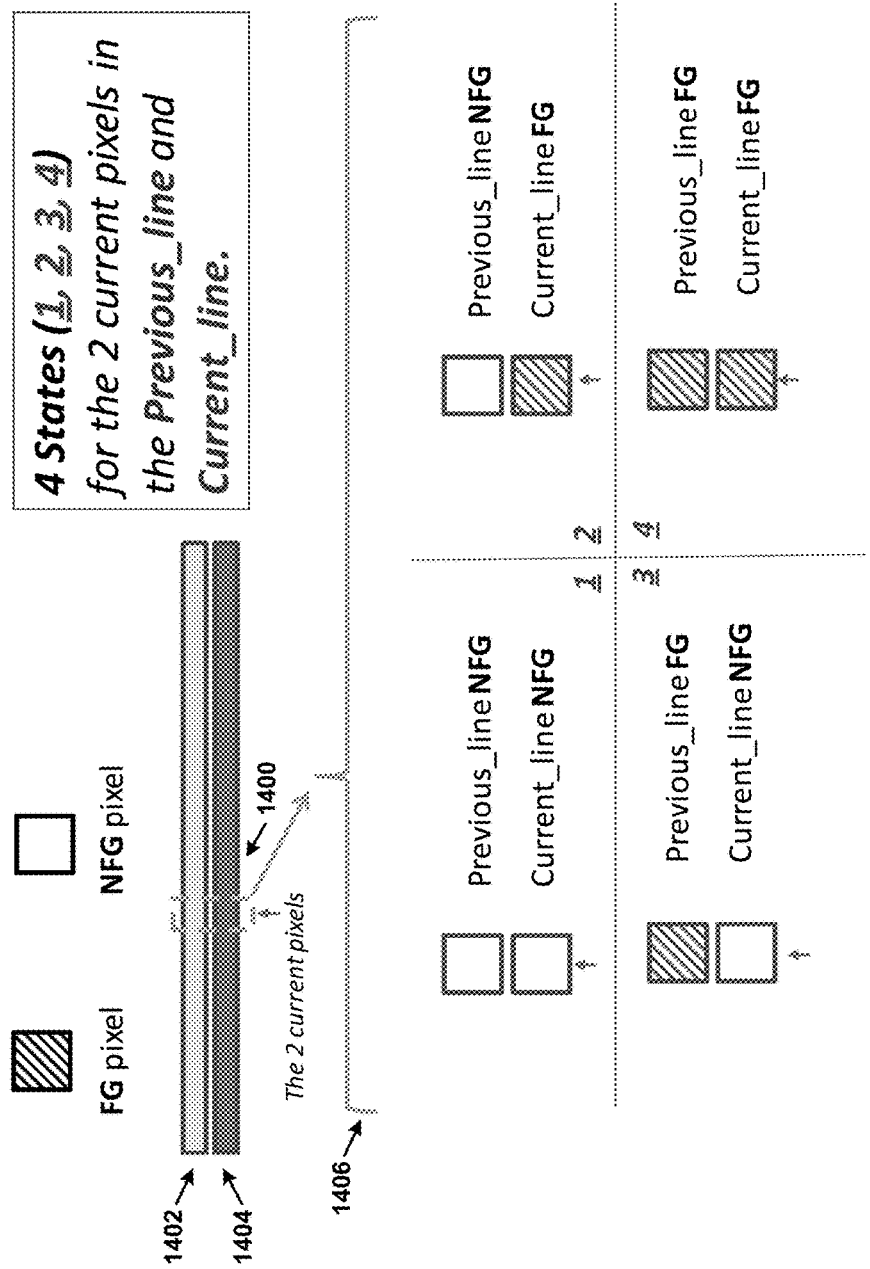
FIGS. 14, 15, 16, 17A, and 17B depict states for detecting pixel clusters, according to example embodiments.

FIGS. 14-18 provide a pedagogical derivation and description of the state machine. FIG. 14 depicts two vertically-adjacent pixels 1400 being considered. The top pixel is from previous line 1402, and the bottom pixel is from current line 1404. In FIGS. 14-18, foreground pixels are denoted with hash marks, and non-foreground pixels are denoted without hash marks. The foreground/non-foreground characteristics of pixels 1400 will fall into one of four possible arrangements 1406. In arrangement 1, both the upper and lower pixels are non-foreground. In arrangement 2, the upper pixel is non-foreground and the lower pixel is foreground. In arrangement 3, the upper pixel is foreground and the lower pixel is non-foreground. In arrangement 4, both the upper and lower pixels are foreground.

Figure 15:
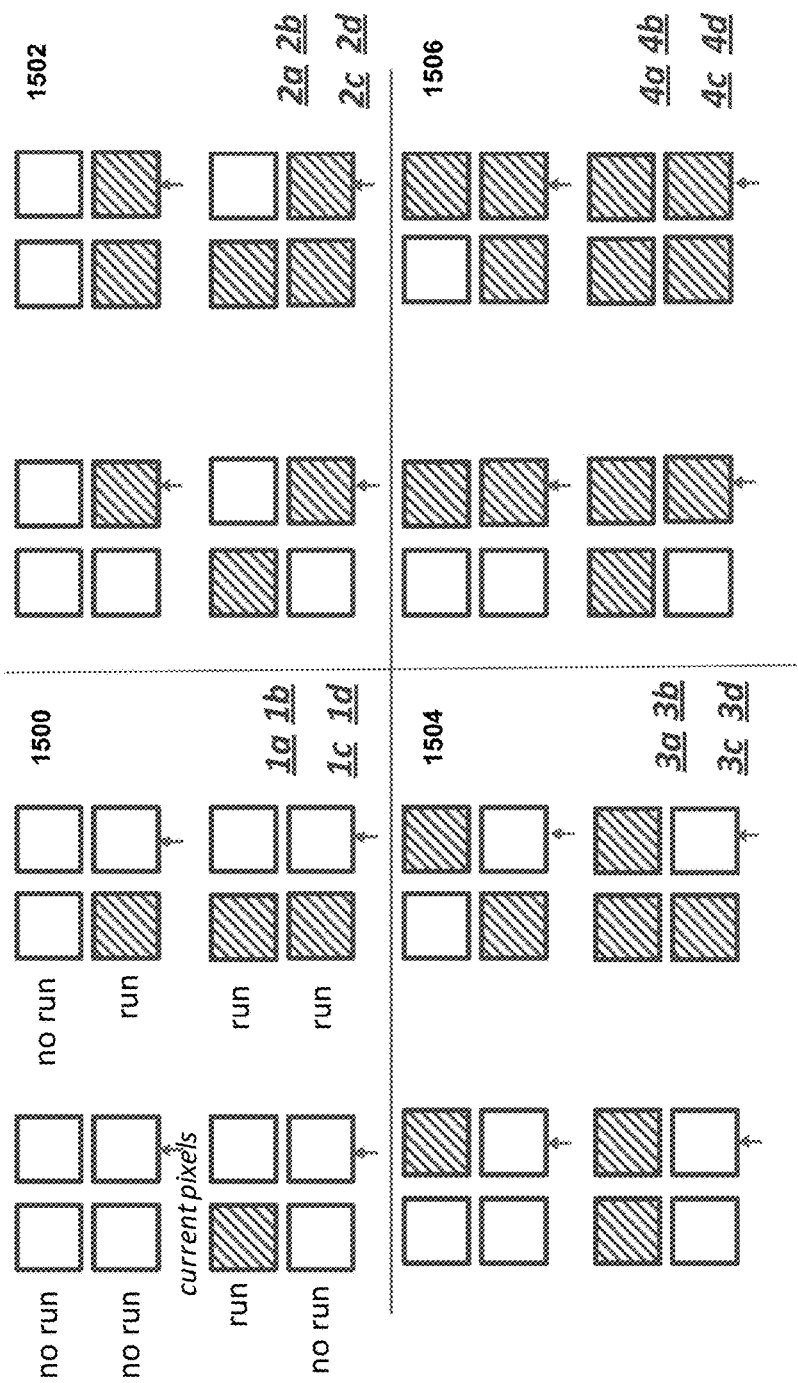

FIG. 15 expands arrangements 1-4 into 16 arrangements by also considering whether a run of consecutive foreground pixels is in either the previous line or the current line. This is accomplished by considering the previous vertical pair of pixels.

For instance, quadrant 1500 of FIG. 15 contains arrangements 1a, 1b, 1c, and 1d. Each of these is a variation of arrangement 1 (both of the vertically-adjacent pixels that are being considered are non-foreground). Arrangement 1a refers to the upper-left arrangement of quadrant 1500, arrangement 1b refers to the upper-right arrangement of quadrant 1500, arrangement 1c refers to the lower-left arrangement of quadrant 1500, and arrangement 1d refers to the lower-right arrangement of quadrant 1500. Similar denotations or arrangements are made in quadrants 1502, 1504, and 1506.

In arrangement 1a, both the upper and lower pixels of the previous pair of vertically-adjacent pixels are non-foreground. In arrangement 1b, the upper pixel of the previous pair of vertically-adjacent pixels is non-foreground and the lower pixel is foreground. In arrangement 1c, the upper pixel of the previous pair of vertically-adjacent pixels is foreground and the lower pixel is non-foreground. In arrangement 1d, both the upper and lower pixels of the previous pair of vertically-adjacent pixels are foreground.

In these arrangements, when a row contains a foreground pixel, that row is considered to contain a run. As example, neither row of arrangement 1a contains a run, only the current (bottom) row of arrangement 1b contains a run, only the top (previous) row of arrangement 1c contains a run, and both rows of arrangement 1d contain runs.

The 16 states of FIG. 15 can be further expanded by considering whether a run on the current line overlaps with a run on the previous line. Expanded states for arrangements 1a, 1b, 1c, and 1d are shown in FIG. 16.

Figure 16:
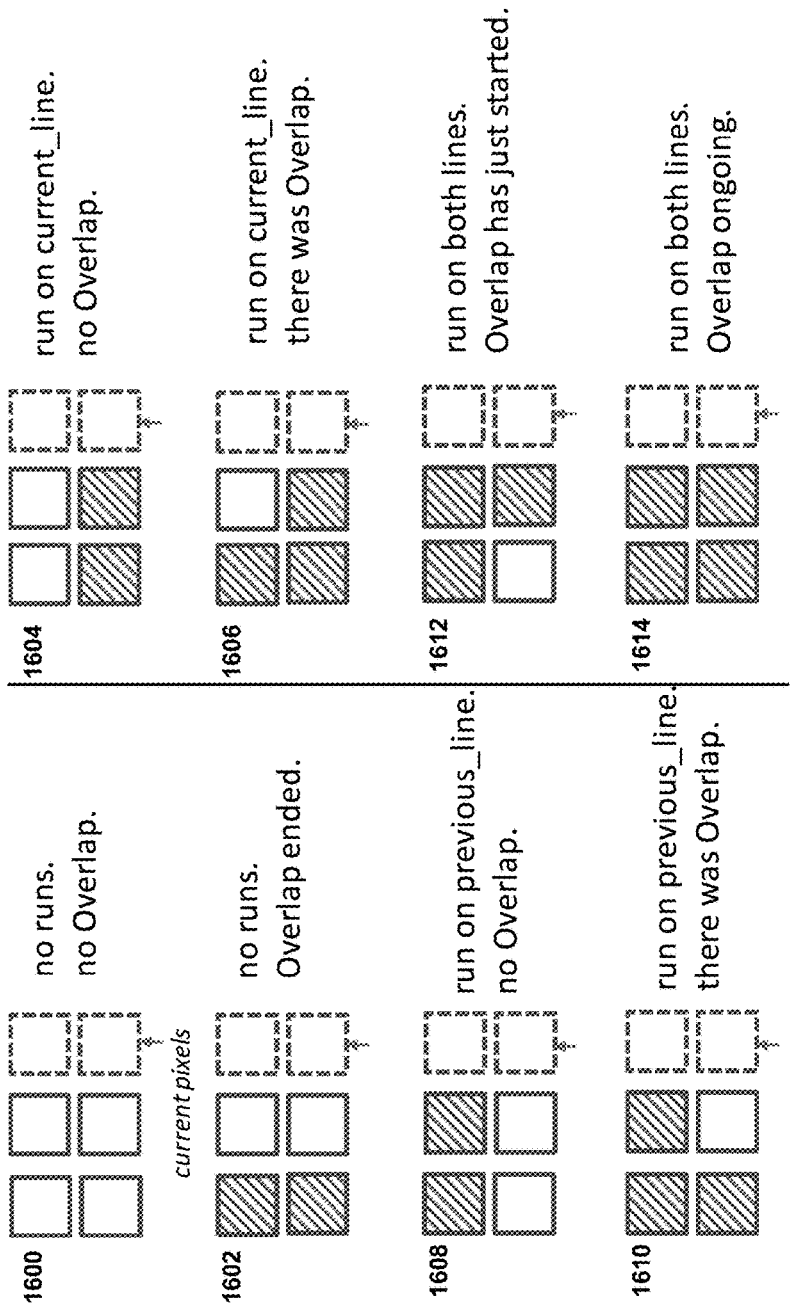

Particularly, the expanded states of FIG. 16 involve looking back two sets of vertically-adjacent pairs of pixels from the current pair. In FIG. 16, expanded states 1600 and 1602 relate to arrangement 1a, expanded states 1604 and 1606 relate to arrangement 1b, expanded states 1608 and 1610 relate to arrangement 1c, and expanded states 1612 and 1614 relate to arrangement 1d.

For instance, in expanded state 1608, only the previous line has non-foreground pixels. There is a run ending on the previous line, but no present overlap with a run on the current line. Since there is no overlap, there is a conclusion of a cluster of foreground pixels. The bin representing this cluster is sent to the library.

In expanded state 1610, there is also a run ending on the previous line, but this run overlaps with a run that recently ended on the current line. Therefore, this cluster of foreground pixels may have more members on the next line. As a consequence, the bin is kept active and not sent to the library at this time.

Some of these expanded states are degenerate, in that they do not need to be explicitly considered, because another expanded state will capture the desired behavior. For instance, in expanded state 1600, both the previous and current lines contain non-foreground pixels and there are no runs on either line that have just ended. Similarly, in expanded state 1602, there is an overlap in runs but neither of these runs has just ended—both ended prior to the current vertical pair of pixels. Therefore, expanded state 1602 is degenerate because the situation it represents does not need to be considered separately from that of expanded state 1600.

Figure 17A:
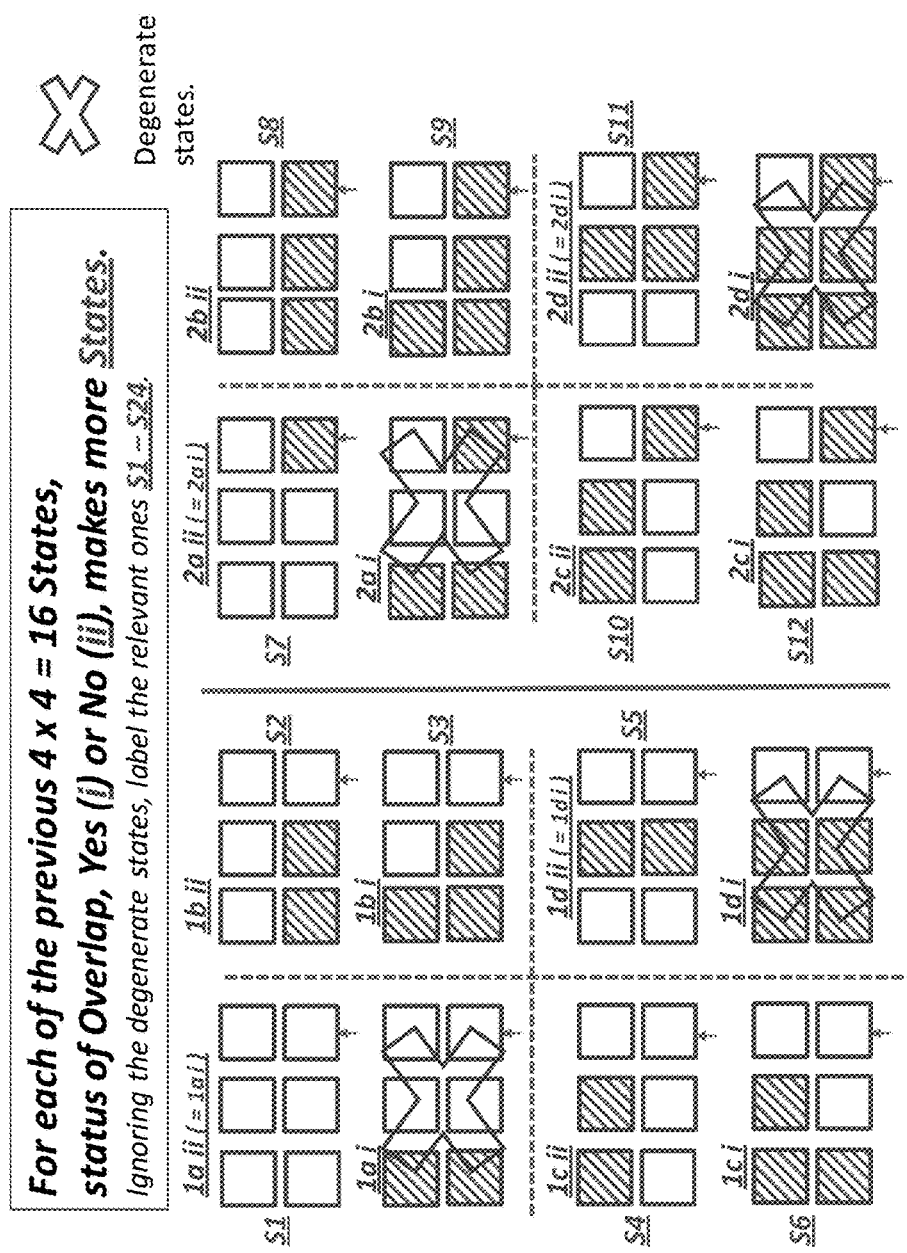
Figure 17B:
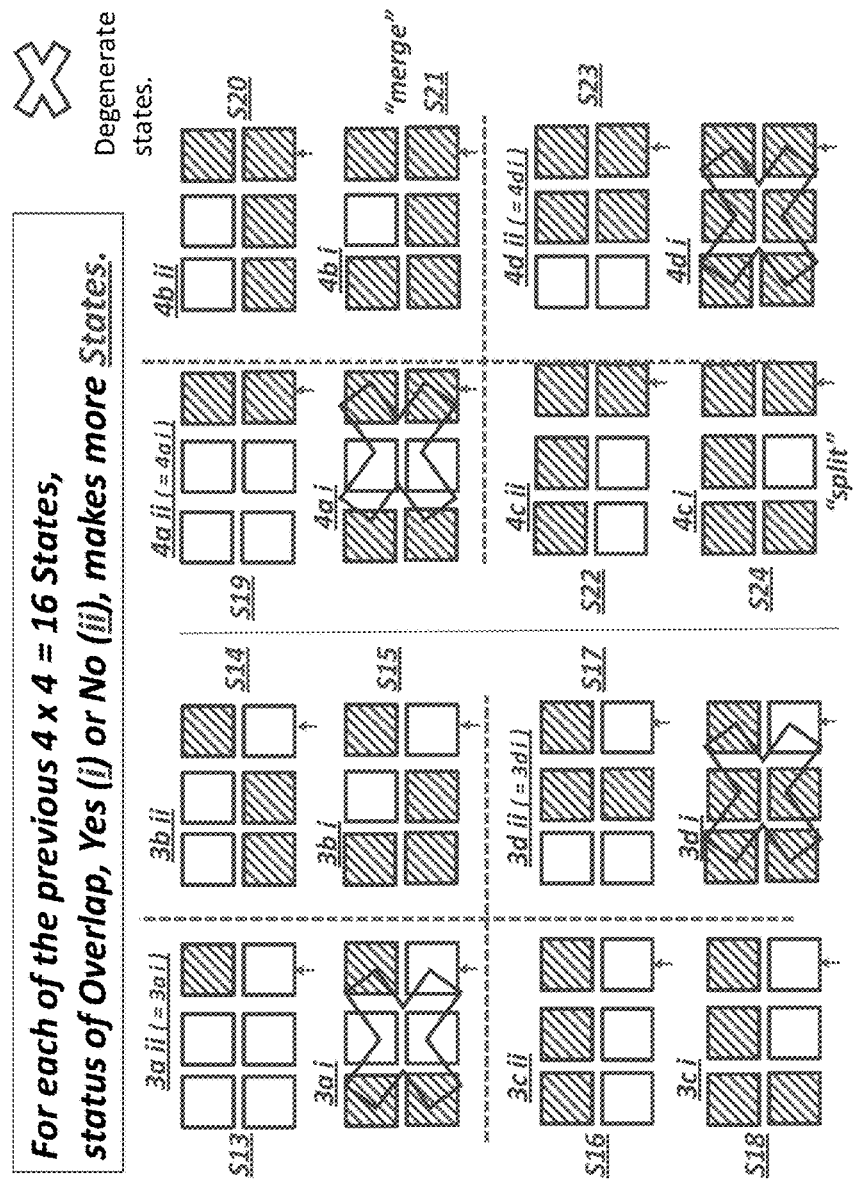

FIGS. 17A and 17B depict 32 states that result from considering each of the 16 states of FIG. 15, as well as whether there is overlap between runs on the previous and current lines. Of the 32 resulting states, 8 are degenerate, and marked accordingly in FIGS. 17A and 17B with a large X. For convenience and clarity, the remaining 24 states are labeled as states S1-S24. For instance, states S1-S4 respectively relate to examples 1600, 1604, 1606, and 1608 in FIG. 16.

States S21 and S24 are special states that involve merge and split behavior. Both of these states represent patterns of foreground pixels in which an overlap ends and then restarts. Special rules apply for each of these states, and are discussed below.

Based on the current state, an action will be taken. Table 1 below maps states to actions. The actions are described below. Note that when the first line of a pixel block is scanned (where there is no previous line), the only valid actions are "do nothing," "adjust the run counters," and "make a new bin."

In state S1, there are no foreground pixels. Therefore, no further action is taken, and processing moves on to the next vertically-adjacent pair of pixels. State S6 represents similar circumstances.

In states S7-S20 and S22-S23, the run counters are adjusted. In each of these states, a run is either beginning or continuing. For example, in state S7, a run on the current line is beginning, while in state S8, a run on the current line is continuing.

TABLE 1

| State | Action |
|---|---|
| S1, S6 | Do nothing. |
| S7-S20, S22-S23 | Adjust the run counters. |
| S2, S14 | Make a new bin. |
| S3, S5, S15, S17 | Append to a bin (of the growing cluster). |
| S4, S10 | Send a bin to the library. |
| S21 | Merge. |
| S24 | Split. |

In states S2 and S14 a new cluster is beginning, so a new bin data structure is created. For example, in state S2, there is no overlap between foreground pixels in the cluster on the current line and any vertically adjacent pixels on the previous line. Therefore, state S2 represents the end of a first line of a cluster. State S14 represents similar circumstances.

In states S3, S5, S15, and S17, an existing cluster is growing. Consequently, the bin data structure for this cluster is appended to and/or updated. For example, in state S3, a cluster that includes at least one pixel on the previous line and at least two pixels on the current line is being processed. Since the there are no more pixels on the current line that are part of the cluster, the bin data structure can be updated accordingly. However, the cluster may include more pixels on the next line (the line below the current line), so the cluster may continue to grow.

In states S4 and S10 a bin containing a fully-defined cluster is sent to the library. For example, in state S4, there is no overlap between the foreground pixels on the previous line and the current line. Since the run on the previous line has ended, the cluster including this run is fully defined, and its bin can be sent to the library for cataloging. State S10 represents similar circumstances.

In state S21, there is an overlap between foreground pixels on the previous and current lines, while the run on the previous line stops and a new run begins on this line. Since both of these runs are part of the same cluster, special rules apply. The bin on the left hand side is then terminated while the bin on the right continues. The total pixel count of the left bin is added to the right bin. In this manner, the total cluster size is tracked.

State S24 is analogous to state S21. There is an overlap between foreground pixels on the previous and current lines, and the run on the current line stops and a new run begins on this line. Since both of these runs are part of the same cluster, special rules apply once more. The information of this cluster is thus split into two bins, i.e. the left and the right. Both bins carry all cluster information, in terms of offset, run length, and pixel count, up until the split takes place. From that point on, the "old" cluster data will be appended by the two separately growing branches.

The rules for States 21 and 24 are based on the observation that clusters that merge or split up often grow to a size beyond that of a microstructure. Thus, it is unlikely that such clusters will be admitted into the library. Still, it may be important to continue keeping track of such clusters with the bins as the line-to-line scanning continues, since some of these clusters can eventually be categorized as microstructures.

Figure 18:
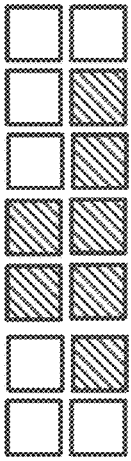
FIG. 18 depicts information related to overlapping foreground pixels, according to example embodiments.

FIG. 18 provides examples of state variables that may be used to track runs and overlaps between the previous and current lines. Table 2 defines the state variables, and these definitions assume that there is an overlap present between the two lines. Collectively, these state variables may be referred to as "overlap_info".

TABLE 2

| States Variable | Definition |
| --- | --- |
| start | Specifies which run contributing to the overlap began first. Set to 0 when the run on the previous line started first, or set to 1 when the run on the current line started first. Either value may be used when the overlap begins simultaneously. |
| start_count | Specifies the number of pixels, before overlap, in the run that started first. |
| end | Specifies which run contributing to the overlap ended first. Set to 0 when the run on the previous line ended first, or set to 1 when the run on the current line ended first. Either value may be used when the runs end simultaneously. |
| end_count | Specifies the number of pixels, after overlap, in the run that ended last. |
| overlap_count | The number of pixels in a cluster that overlap between the previous line and the current line. |

In FIG. 18, example 1800 depicts two lines wherein a 2-pixel run on the previous line overlaps with a 5-pixel run on the current line. The run on the current line starts before the run on the previous line, so the value of the start state variable is 1. This run continues for 1 pixel before the run on the previous line begins, so the value of the start_count state variable is 1. The run on the current line ends after the run on the previous line, so the value of the end state variable is 0. This run continues for 2 pixels after the run on the previous line ends, so the value of the end_count state variable is 2. Since there is an overlap of 2 pixels between the two runs, the value of the overlap_count state variable is 2.

Example 1802 depicts two lines wherein a 4-pixel run on the previous line overlaps with a 3-pixel run on the current line. The run on the previous line starts before the run on the current line, so the value of the start state variable is 0. This run continues for 2 pixels before the run on the current line begins, so the value of the start_count state variable is 2. The run on the current line ends after the run on the previous line, so the value of the end state variable is 0. This run continues for 1 pixel after the run on the previous line ends, so the value of the end_count state variable is 1. Since there is an overlap of 2 pixels between the two runs, the value of the overlap_count state variable is 2.

Example 1804 depicts two lines wherein a 4-pixel run on the previous line overlaps with a 3-pixel run on the current line. The run on the previous line starts before the run on the current line, so the value of the start state variable is 0. This run continues for 1 pixel before the run on the current line begins, so the value of the start_count state variable is 1. The run on the current line ends simultaneously with the run on the previous line, so the value of the end state variable can be either 0 or 1, and the value of the end_count state variable is 0 (i.e., when the end_count state variable is 0, the value of the end state variable can be ignored). Since there is an overlap of 3 pixels between the two runs, the value of the overlap_count state variable is 3.

FIGS. 19A-19G step through an example of the state machine operating on a cluster. In these figures, two additional variables are used: FG_run_current, which specifies the number of pixels in a run on the current line that have been scanned so far, and FG_run_prev, which specifies the number of pixels in a run up to a pixel directly above the pixel being scanned on the current line. Throughout these figures, for most positions with non-foreground pixels, the state machine is in state S1 (the "do nothing" state). Thus, a separate analysis of these positions will be omitted.

Figure 19A:
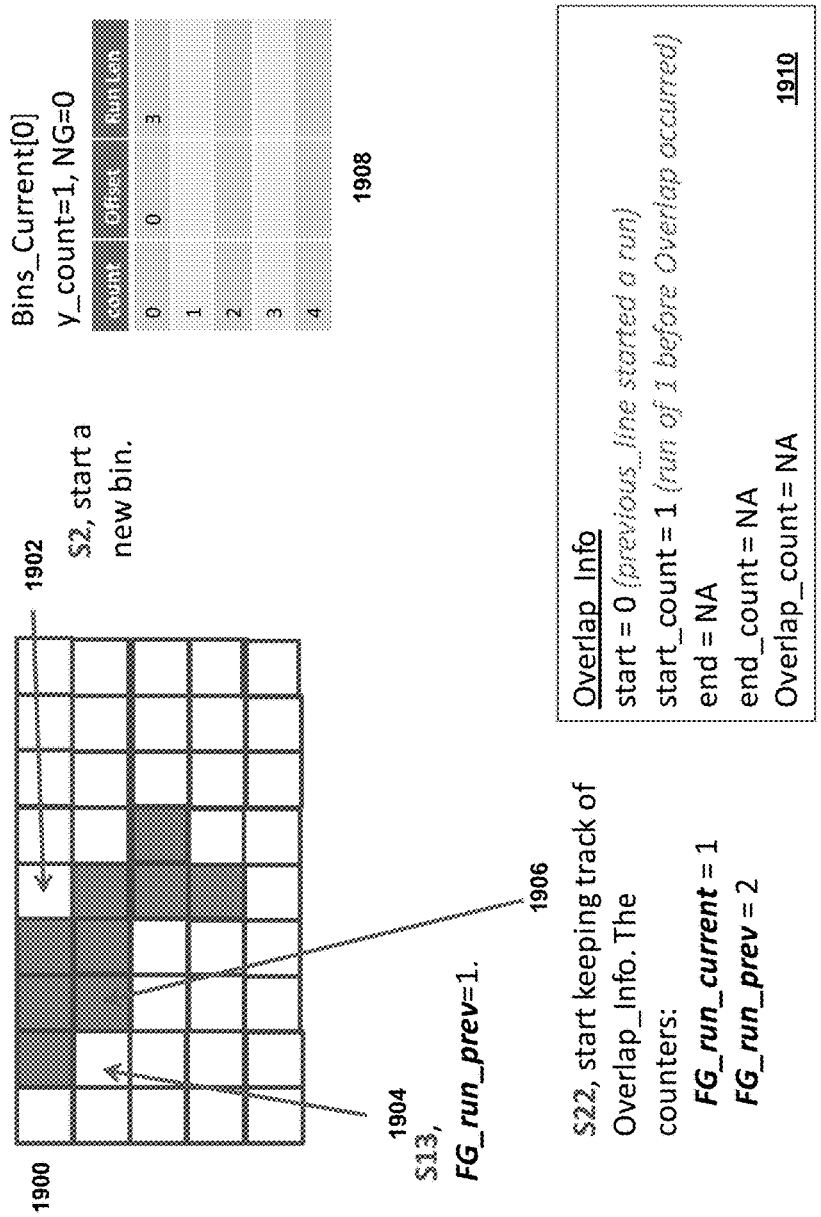

In FIG. 19A, cluster 1900 is scanned left to right, starting at the top line. At position 1902, a run of three foreground pixels has been detected, and the state machine is in state S2. Accordingly, a bin 1908 (bins_current[0]) is created and populated with a representation of this run.

At position 1904, the state machine is in state S13. FG_run_prev is set to 1. At position 1906, the state machine is in state S22. FG_run_prev is set to 2 and FG_run_current is set to 1. Also, overlap_info 1910 is filled out as shown in FIG. 19A, since this state involves an overlap.

Figure 19B:
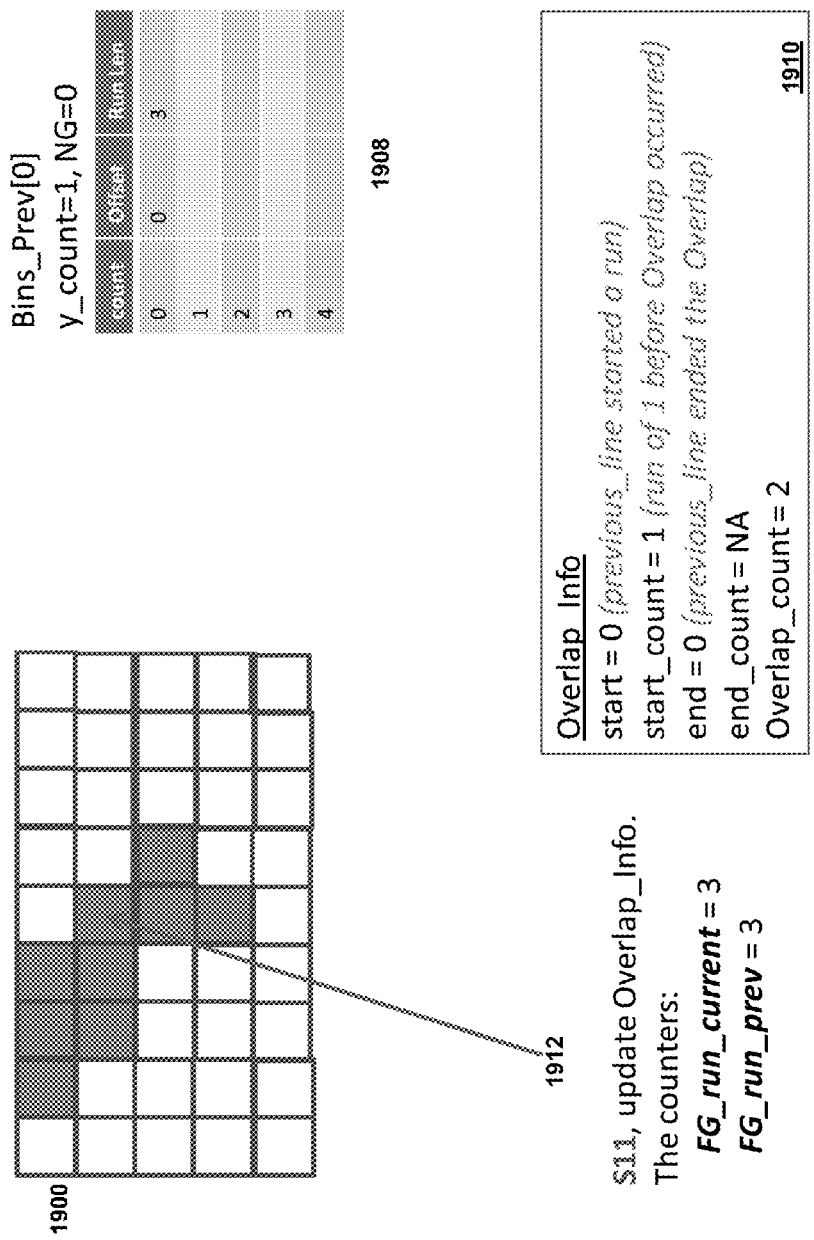

The example is continued in FIG. 19B. At position 1912, the state machine is in state S11. FG_run_prev is set to 3 and FG_run_current is set to 3. Values of overlap_info 1910 are updated accordingly.

The example is continued in FIG. 19C. At position 1914, the state machine is in state S3. Values of overlap_info 1910 are updated accordingly. Since this position represents the end of a run, bin 1908 is copied to bin 1916 and then the offset and run length information for the run on the current are is added to bin 1916. This information is derived from overlap_info 1910. For instance, overlap_info 1910 indicates that the run on the previous line started one pixel before the run on the current line, the runs overlapped for two pixels, then the run on the current line continued for one more pixel. Thus, the offset for the current line is 1 (based on end and end_count) and the run length is 3 (based on all state variables in overlap info).

The example is continued in FIG. 19D. At position 1918, the state machine is in state S22. Values of overlap_info 1910 are updated accordingly. FG_run_prev is set to 3 and FG_run_current is set to 1. Also, bin 1916 is copied to bin 1920.

Figure 19E:
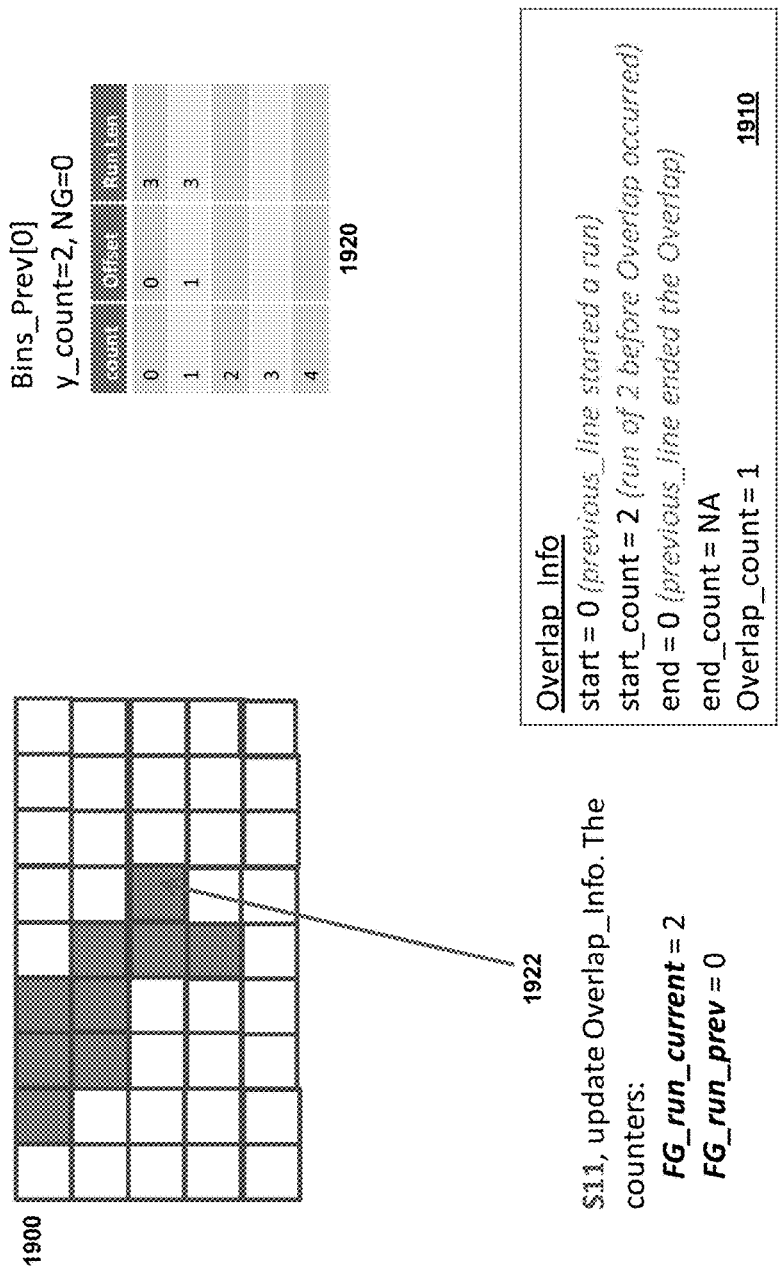

The example is continued in FIG. 19E. At position 1922, the state machine is in state S11. Values of overlap_info 1910 are updated accordingly. FG_run_prev is set to 0 and FG_run_current is set to 2.

Figure 19F:
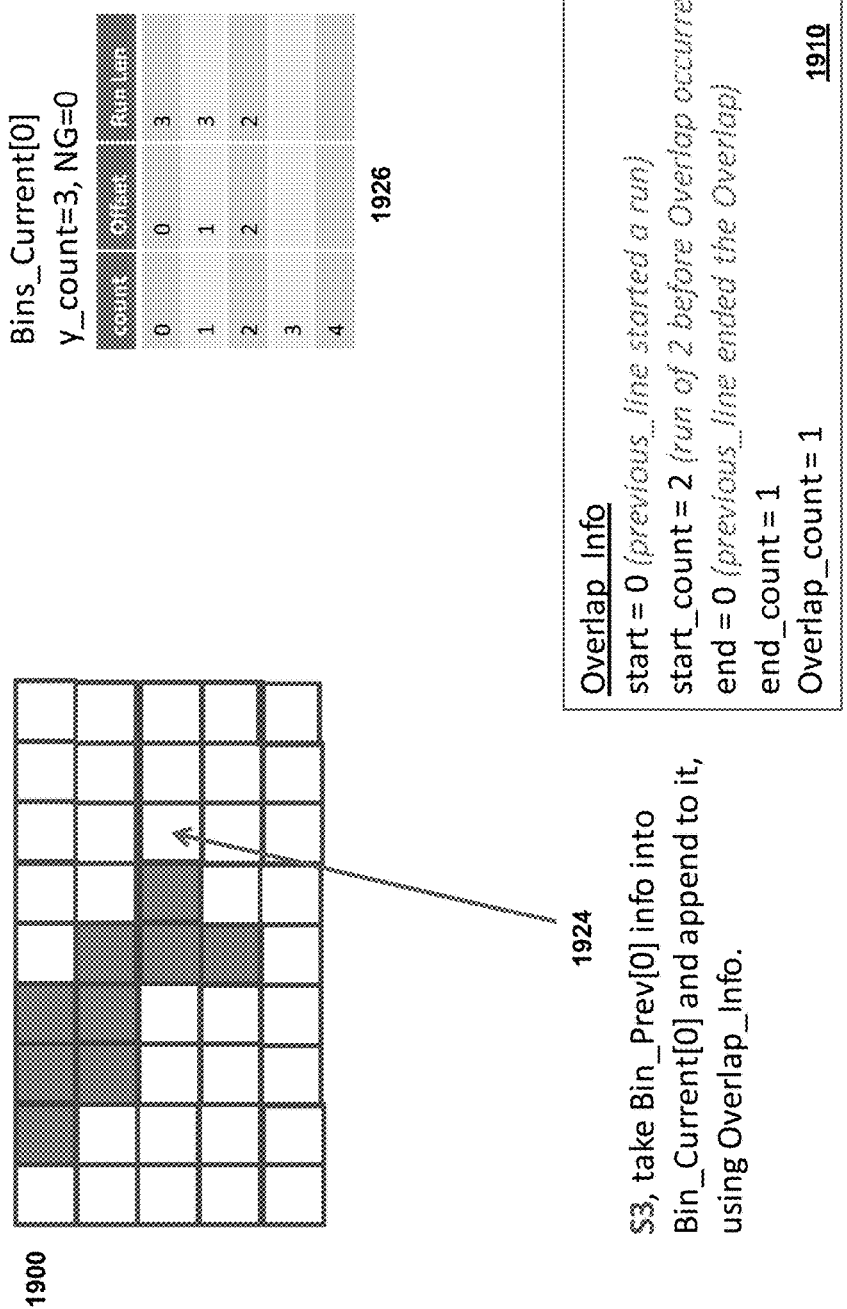

The example is continued in FIG. 19F. At position 1924, the state machine is in state S3. Values of overlap_info 1910 are updated accordingly. Since this position represents the end of a run, bin 1920 is copied to bin 1926 and then the offset and run length information for the run on the current line is added to bin 1926.

Figure 19G:
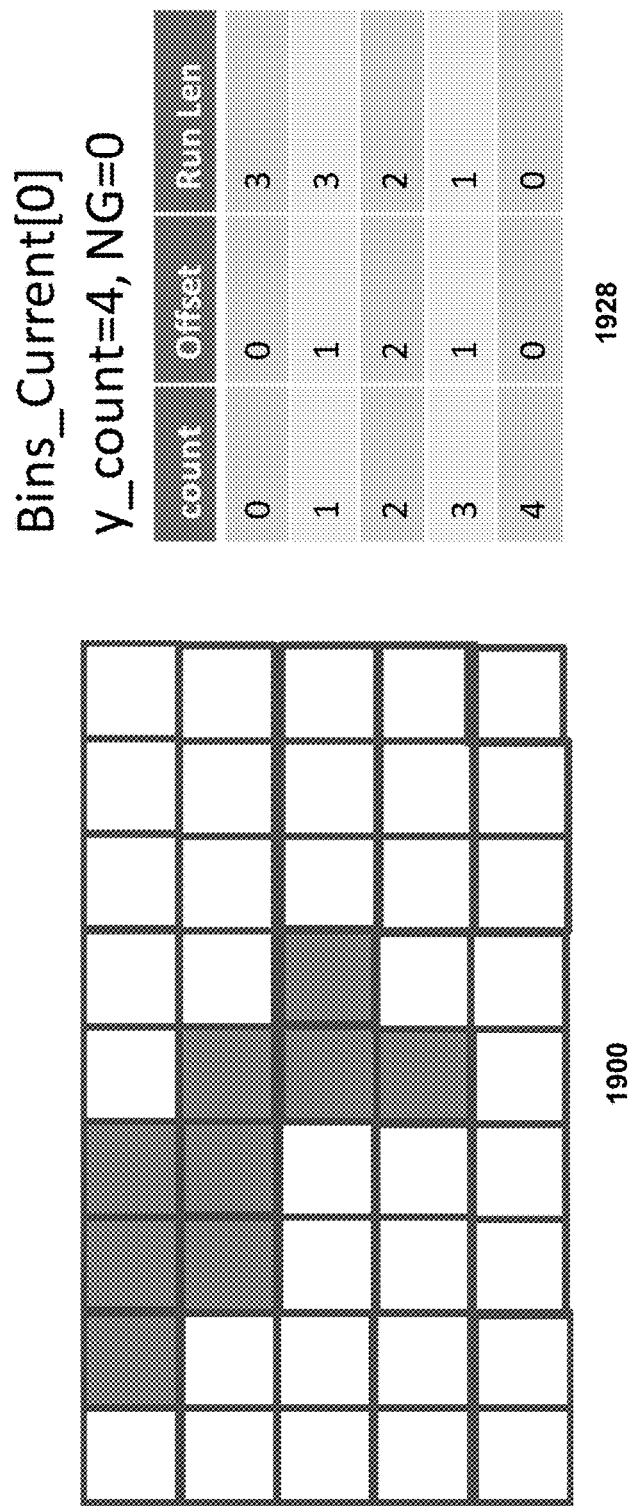

This process continues until bin 1928, shown in FIG. 19G, fully represents cluster 1900. At this point, bin 1928 may be sent to the library.

c. Identifying Clusters that are Microstructures

Once at least some of the clusters in a particular pixel block have been identified and cataloged in the library, a determination may be made as to whether this pixel block contains microstructures. There are two conditions that will result in the pixel block being deemed to contain microstructures.

First, if there are at least j library entries, each representing at least k total clusters, the pixel block may be deemed to contain microstructures. For instance, the total 1210 value of each library value may be compared to k. Then, the number of library entries with a total 1210 value of at least k may be counted. If the sum is at least j, then the library may be flagged as containing microstructures. Example values of j may be 2, 3, 4, etc., and example value of k may be 5, 10, 15, etc.

Second, even if there are fewer than j library entries representing at least k total clusters, if the total number of foreground pixels in the l library entries with the highest respective values of total 1210 exceeds a threshold, then the pixel block may be deemed to contain microstructures. For example, if this threshold is 100 and there over 100 pixels in l library entries, then the library may be flagged as containing microstructures.

| Algorithm 1 |
| --- |
| 1   For each color plane: |
| 2      For the 3 library entries with the highest repeat numbers (i.e. the 3 most common patterns), find the total number of repeats for all 3. Call this SUM_FREQ. |
| 3      For these same 3 patterns, find the total number of foreground pixels in all repeats. Call this SUM_PIXEL_CNT. |
| 4   For all color planes: |
| 5      Find the largest value of SUM_FREQ. Call this MAX_PLANE_ FREQ. |
| 6      If MAX_PLANE_FREQ exceeds a threshold (e.g. THRESH_FREQ), this<br>        Pixel block contains microstructures. |
| 8      Else |
| 9         If, for the same color plane affiliated with MAX_PLANE_FREQ, the SUM_PIXEL_CNT value exceeds a threshold (e.g.<br>          THRESH_PIXEL_CNT), this pixel block contains microstructures. |

Alternatively, algorithm 1 shown above may be used. In short, this algorithm determines, for the three most common cluster patterns in each color plane of the digital image, (i) the total number of repeated clusters, and (ii) the total number of foreground pixels. Then, for each color plane, if the largest total number of clusters (as calculated across the three most common cluster patterns in each color plane) exceeds a cluster threshold, then the pixel block is deemed to contain microstructures. Alternatively, for the color plane with the largest total number of clusters (again, as calculated across the three most common cluster patterns in each color plane), if the total number of foreground pixels therein exceeds a pixel threshold, then the pixel block is deemed to contain microstructures.

Once a given number of pixel blocks (e.g., 6, 9, 12, etc.) across all color planes have been flagged as containing microstructures, an FM halftone may be applied to the digital image. In some cases, this involves determining to apply the FM halftone before all pixel blocks have been scanned. For instance, once the given number of pixel blocks are flagged, no more pixel blocks need to be considered for purposes of making this determination.

7. Example Operations

Figure 20:
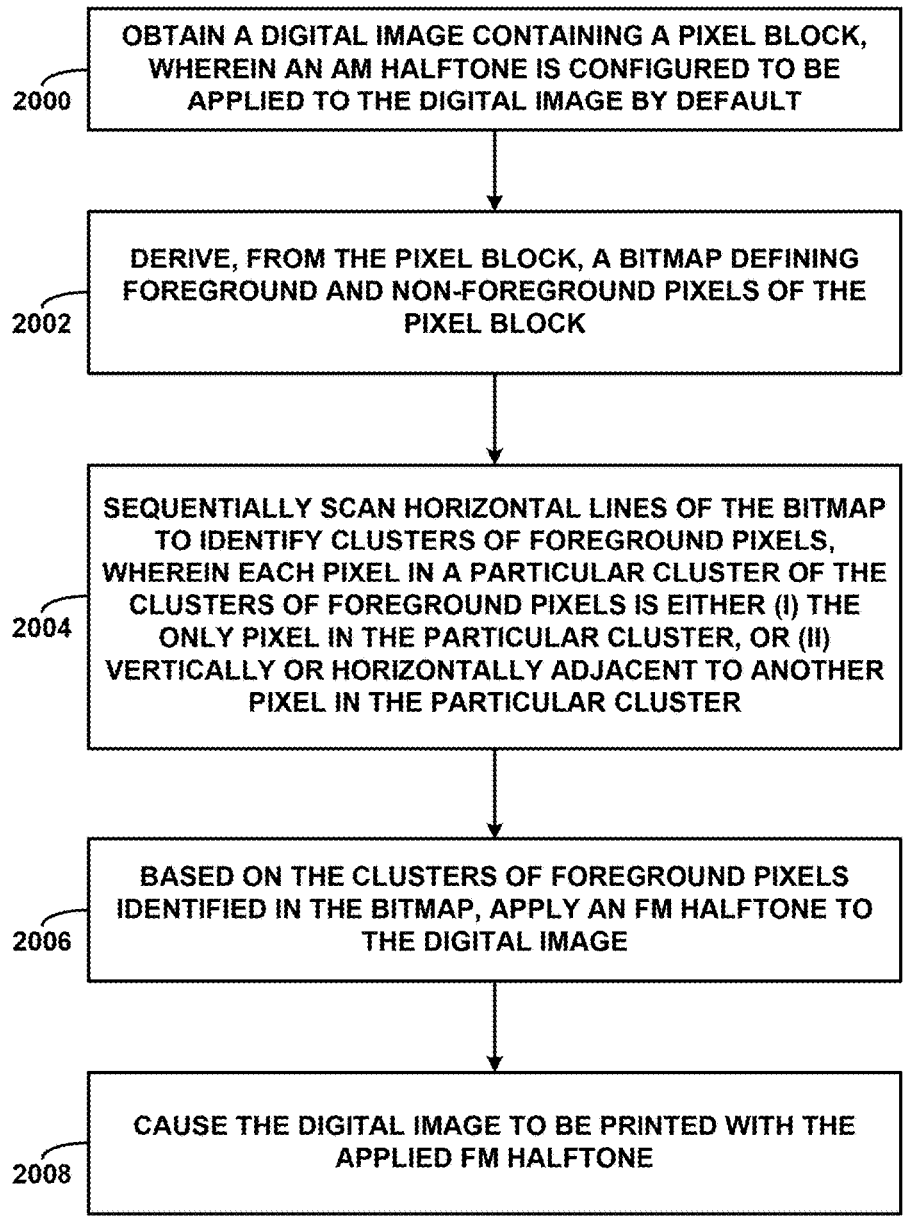
FIG. 20 is a flow chart, according to example embodiments.

FIG. 20 is a flow chart of an example embodiment. The blocks illustrated by this flow chart represent steps that may be carried out by one or more printing devices, such as printing device 100, and/or computing devices, such as computing device 300. Further, aspects of each individual block may be distributed between multiple computing or printing devices.

At block 2000, a digital image containing a pixel block may be obtained, e.g., from a memory. An AM halftone may be configured to be applied to the digital image by default. At block 2002, a bitmap defining foreground and non-foreground pixels of a pixel block may be derived from the pixel block.

At block 2004, horizontal lines of the bitmap may be sequentially scanned to identify clusters of foreground pixels. Each pixel in a particular cluster of the clusters of foreground pixels may be either (i) the only pixel in the particular cluster, or (ii) vertically or horizontally adjacent to another pixel in the particular cluster. At block 2006, possibly based on the clusters of foreground pixels identified in the bitmap, an FM halftone may be applied to the digital image. At block 2008, the digital image may be caused to be printed with the applied FM halftone.

In some embodiments, rather than immediately causing the digital image to be printed, the halftoned digital image may first be stored to a memory.

In some embodiments, the operations of FIG. 20 may be carried out by a printer device. In other embodiments, the operations of FIG. 20 may be carried out by a computing device that ultimately may transmit the halftoned digital image to a printer device.

In some embodiments, deriving, from the pixel block, the bitmap defining foreground and non-foreground pixels of the pixel block involves: (i) identifying, for a particular pixel of pixel block, neighboring pixels within a radius of the particular pixel, (ii) determining a range of pixel values for the particular pixel and the neighboring pixels, (iii) determining a threshold distance, (iv) determining that (a) no pixels of the particular pixel and the neighboring pixels fall within a subrange defined by: a low end of the range plus the threshold distance, and a high end of the range minus the threshold distance, and (b) the particular pixel falls within the threshold distance of an end of the range that represent pixels with more intensity than the subrange; and (v) marking, in the bitmap, the particular pixel as a foreground pixel.

In some embodiments, sequentially scanning horizontal lines of the bitmap to identify clusters of foreground pixels involves defining identified clusters with a bin data structure that specifies an offset position and a run length for each line of the respective identified clusters, and maintaining respective counts of occurrences of clusters in a library data structure.

In some embodiments, sequentially scanning horizontal lines of the bitmap to identify clusters of foreground pixels further involves: determining that a particular identified cluster contains any one of: (i) more than a threshold number of lines, (ii) more than a threshold run length, or (iii) more than a threshold number of pixels, and flagging the particular identified cluster as a non-microstructure that is not to be represented in the library data structure.

In some embodiments, defining identified clusters with the bin structure that specifies the offset position and the run length for each line of the respective identified clusters involves: (i) maintaining partially-completed bin data structures for partially-defined clusters identified on a previous line and a current line, where the previous line is immediately above the current line in the pixel block, where the previous line was previously scanned, and where the current line is in the process of being scanned, (ii) possibly based on pixels in the previous and the current line, determining that a particular cluster including pixels on the previous line is fully defined, and (iii) representing the particular cluster in the bin data structure.

In some embodiments, maintaining partially-completed bin data structures for partially-defined clusters identified on the previous line and the current line involves scanning the previous line and the current line left-to-right. The foreground or non-foreground status of a vertically-adjacent pair of pixels encompassing the previous line and the current line may determine, at least in part, whether the particular cluster is fully defined.

In some embodiments, presence of a run of foreground pixels that is (i) in the previous line or the current line, and (ii) immediately left of the vertically-adjacent pair of pixels, determines whether the particular cluster is fully defined. In some embodiments, where runs of foreground pixels are in the previous line and the current line, and where whether the runs overlap determines whether the particular cluster is fully defined.

In some embodiments, applying the FM halftone to the digital image is based on determining that there is at least a first threshold extent of clusters in the pixel block. Alternatively or additionally, applying the FM halftone to the digital image is based on determining that there is at least a second threshold extent of foreground pixels present in the clusters.

In some embodiments, applying the FM halftone to the digital image involves applying a color conversion table to the digital image. The color conversion table maps colors resulting from FM halftoning to colors resulting from AM halftoning.

While the example embodiments herein generally disclose processing a pixel block line-by-line from top to bottom, as well as processing each line left to right, other implementations are possible. For example, lines may be processed bottom to top and/or from right to left. Further, instead of processing horizontal lines, vertical lines may be processed. Thus, the algorithms, techniques and operations described herein can be adapted to a multitude of specific implementations.

8. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent from the foregoing descriptions. Such modifications and variations are intended to fall within the scope of the appended claims.

With respect to any or all of the ladder diagrams, scenarios, and flow charts in the figures and as discussed herein, each block and/or communication may represent a processing of information and/or a transmission of information in accordance with example embodiments. Alternative embodiments may be included within the scope of such example embodiments. Further, more or fewer blocks and/or functions may be used with any of the ladder diagrams, scenarios, and flow charts discussed herein, and these ladder diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, and/or a tangible storage device.

Additionally, any enumeration of elements, blocks, or steps in this specification, the drawings, or the claims is for purposes of clarity. Thus, such enumeration should not be interpreted to require or imply that these elements, blocks, or steps adhere to a particular arrangement or are carried out in a particular order.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A computer-implemented method comprising execution, by a processor, of operations including:
   obtaining, from a memory, a digital image containing a pixel block, wherein an AM halftone is configured to be applied to the digital image by default;
   deriving, from the pixel block, a bitmap defining foreground and non-foreground pixels of the pixel block, wherein deriving the bitmap involves: (i) determining a range of pixel values for a particular pixel of the pixel block and neighboring pixels within a radius of the particular pixel, (ii) determining that a value of the particular pixel falls within a threshold distance of an end of the range that represent pixels with higher intensity than a remaining portion of the range, and (iii) marking, in the bitmap, the particular pixel as a foreground pixel;
   sequentially reading horizontal lines of the bitmap to identify clusters of foreground pixels, wherein each pixel in a particular cluster of the clusters of foreground pixels is either (i) the only pixel in the particular cluster, or (ii) vertically or horizontally adjacent to another pixel in the particular cluster;
   based on the clusters of foreground pixels identified in the bitmap, applying an FM halftone to the digital image instead of the AM halftone; and
   causing the digital image to be printed with the applied FM halftone.

2. The method of claim 1, wherein deriving the bitmap also involves:
   determining that no values of the particular pixel and the neighboring pixels fall within a subrange defined by: a low end of the range plus the threshold distance, and a high end of the range minus the threshold distance.

3. The method of claim 1, wherein sequentially reading horizontal lines of the bitmap to identify clusters of foreground pixels comprises:

defining identified clusters with a bin data structure that specifies an offset position and a run length for each line of the respective identified clusters; and maintaining respective counts of occurrences of clusters in a library data structure.

4. The method of claim 3, wherein sequentially reading horizontal lines of the bitmap to identify clusters of foreground pixels further comprises:

determining that a particular identified cluster contains any one of: (i) more than a threshold number of lines, (ii) more than a threshold run length, or (iii) more than a threshold number of pixels; and flagging the particular identified cluster as a non-microstructure that is not to be represented in the library data structure.

5. The method of claim 3, wherein defining identified clusters with the bin structure that specifies the offset position and the run length for each line of the respective identified clusters comprises:

maintaining partially-completed bin data structures for partially-defined clusters identified on a previous line and a current line, wherein the previous line is immediately above the current line in the pixel block, wherein the previous line was previously read, and wherein the current line is in the process of being read;

based on pixels in the previous and the current line, determining that the particular cluster is fully defined; and representing the particular cluster in the bin data structure.

6. The method of claim 5, wherein maintaining partially-completed bin data structures for partially-defined clusters identified on the previous line and the current line comprises reading the previous line and the current line left-to-right, wherein the foreground or non-foreground status of a vertically-adjacent pair of pixels encompassing the previous line and the current line determines, at least in part, whether the particular cluster is fully defined.

7. The method of claim 6, wherein presence of a run of foreground pixels that is (i) in the previous line or the current line, and (ii) immediately left of the vertically-adjacent pair of pixels, determines whether the particular cluster is fully defined.

8. The method of claim 7, wherein runs of foreground pixels are in the previous line and the current line, and wherein whether the runs overlap determines whether the particular cluster is fully defined.

9. The method of claim 1, wherein applying the FM halftone to the digital image is based on determining that there is at least a first threshold extent of clusters in the pixel block.

10. The method of claim 9, wherein applying the FM halftone to the digital image is based on determining that there is at least a second threshold extent of foreground pixels present in the clusters.

11. The method of claim 1, wherein applying the FM halftone to the digital image comprises applying a color conversion table to the digital image, wherein the color conversion table maps colors resulting from FM halftoning to colors resulting from AM halftoning.

12. An article of manufacture including a non-transitory computer-readable medium, having stored thereon program instructions that, upon execution by a processor, cause the processor to perform operations comprising:

obtaining, from a memory, a digital image containing a pixel block, wherein an AM halftone is configured to be applied to the digital image by default;

deriving, from the pixel block, a bitmap defining foreground and non-foreground pixels of the pixel block, wherein deriving the bitmap involves: (i) determining a range of pixel values for a particular pixel of the pixel block and neighboring pixels within a radius of the particular pixel, (ii) determining that a value of the particular pixel falls within a threshold distance of an end of the range that represent pixels with higher intensity than a remaining portion of the range, and (iii) marking, in the bitmap, the particular pixel as foreground pixel;

sequentially reading horizontal lines of the bitmap to identify clusters of foreground pixels, wherein each pixel in a particular cluster of the clusters of foreground pixels is either (i) the only pixel in the particular cluster, or (ii) vertically or horizontally adjacent to another pixel in the particular cluster;

based on the clusters of foreground pixels identified in the bitmap, applying an FM halftone to the digital image instead of the AM halftone; and causing the digital image to be printed with the applied FM halftone.

13. The article of manufacture of claim 12, wherein sequentially reading horizontal lines of the bitmap to identify clusters of foreground pixels comprises:

defining identified clusters with a bin data structure that specifies an offset position and a run length for each line of the respective identified clusters; and maintaining respective counts of occurrences of clusters in a library data structure.

14. The article of manufacture of claim 13, wherein sequentially reading horizontal lines of the bitmap to identify clusters of foreground pixels further comprises:

determining that a particular identified cluster contains any one of: (i) more than a threshold number of lines, (ii) more than a threshold run length, or (iii) more than a threshold number of pixels; and flagging the particular identified cluster as a non-microstructure that is not to be represented in the library data structure.

15. The article of manufacture of claim 13, wherein defining identified clusters with the bin structure that specifies the offset position and the run length for each line of the respective identified clusters comprises:

maintaining partially-completed bin data structures for partially-defined clusters identified on a previous line and a current line, wherein the previous line is immediately above the current line in the pixel block, wherein the previous line was previously read, and wherein the current line is in the process of being read;

based on pixels in the previous and the current line, determining that the particular cluster is fully defined; and representing the particular cluster in the bin data structure.

16. The article of manufacture of claim 15, wherein maintaining partially-completed bin data structures for partially-defined clusters identified on the previous line and the current line comprises reading the previous line and the current line left-to-right, wherein the foreground or non-foreground status of a vertically-adjacent pair of pixels encompassing the previous line and the current line determines, at least in part, whether the particular cluster is fully defined.

17. The article of manufacture of claim 16, wherein presence of a run of foreground pixels that is (i) in the previous line or the current line, and (ii) immediately left of the vertically-adjacent pair of pixels, determines whether the particular cluster is fully defined.

18. The article of manufacture of claim 12, wherein applying the FM halftone to the digital image is based on determining that there is at least a first threshold extent of clusters in the pixel block.

19. The article of manufacture of claim 12, wherein applying the FM halftone to the digital image is based on determining that there is at least a second threshold extent of foreground pixels present in the clusters.

20. A computing device comprising:
   a processor;
   memory; and
   program instructions, stored in the memory, that upon execution by the processor cause the computing device to perform operations comprising:
      obtaining, from the memory, a digital image containing a pixel block, wherein an AM halftone is configured to be applied to the digital image by default;
      deriving, from the pixel block, a bitmap defining foreground and non- foreground pixels of the pixel block, wherein deriving the bitmap involves: (i) determining a range of pixel values for a particular pixel of the pixel block and neighboring pixels within a radius of the particular pixel, (ii) determining that a value of the particular pixel falls within a threshold distance of an end of the range that represent pixels with higher intensity than a remaining portion of the range, and (iii) marking, in the bitmap, the particular pixel as a foreground pixel;
      sequentially reading horizontal lines of the bitmap to identify clusters of foreground pixels, wherein each pixel in a particular cluster of the clusters of foreground pixels is either (i) the only pixel in the particular cluster, or (ii) vertically or horizontally adjacent to another pixel in the particular cluster;
      based on the clusters of foreground pixels identified in the bitmap, applying an FM halftone to the digital image instead of the AM halftone; and
      causing the digital image to be printed with the applied FM halftone.

* * * * *